United States Patent
Yu et al.

(10) Patent No.: US 12,499,254 B2
(45) Date of Patent: Dec. 16, 2025

(54) ENFORCING SECURITY WITHIN A DATA PLATFORM

(71) Applicant: Palantir Technologies Inc., Denver, CO (US)

(72) Inventors: Christopher Yu, Culver City, CA (US); Hannah Korus, Denver, CA (US); Katherine Carras, Toronto (CA); Kevin Lowe, San Francisco, CA (US); Lam Tran, Menlo Park, CA (US); Patrick Koenig, Mountain View, CA (US); Sebastian Brueckner, Redwood City, CA (US); Thomas Playford, London (GB); Yin Lin, Fremont, CA (US)

(73) Assignee: Palantir Technologies Inc., Denver, CO (US)

( * ) Notice: Subject to any disclaimer, the term of this patent is extended or adjusted under 35 U.S.C. 154(b) by 609 days.

(21) Appl. No.: 17/849,291

(22) Filed: Jun. 24, 2022

(65) Prior Publication Data

US 2022/0414239 A1    Dec. 29, 2022

Related U.S. Application Data

(60) Provisional application No. 63/214,734, filed on Jun. 24, 2021.

(51) Int. Cl.
G06F 21/62    (2013.01)

(52) U.S. Cl.
CPC ...... G06F 21/62 (2013.01); *G06F 2221/2113* (2013.01)

(58) Field of Classification Search
CPC .................. G06F 21/62; G06F 2221/2113
See application file for complete search history.

(56) References Cited

U.S. PATENT DOCUMENTS

| | | | |
|---|---|---|---|
| 10,437,983 B1 * | 10/2019 | Fessel | H04L 63/1416 |
| 2006/0206485 A1 | 9/2006 | Rubin et al. | |
| 2019/0213346 A1 * | 7/2019 | Friedman | G06F 21/6218 |
| 2019/0236598 A1 * | 8/2019 | Padmanabhan | G06Q 20/389 |
| 2019/0268284 A1 * | 8/2019 | Karame | H04L 9/3236 |
| 2020/0334370 A1 * | 10/2020 | Turgeman | G06F 21/6218 |
| 2021/0103605 A1 | 4/2021 | Ducott, III et al. | |

FOREIGN PATENT DOCUMENTS

EP    4109316 A1 * 12/2022 ............. G06F 21/62

OTHER PUBLICATIONS

Extended European Search Report dated Nov. 21, 2022, issued in related European Application No. 22180857.9 (14 pages).

* cited by examiner

*Primary Examiner* — Phy Anh T Vu
(74) *Attorney, Agent, or Firm* — Sheppard Mullin Richter & Hampton LLP

(57) ABSTRACT

Computing systems and methods are provided for defining, within a data platform, a segment having constraints at a level of the segment, implementing the constraints or the classification rules within the segment while insulating resources within the segment from inheriting the constraints, and controlling an ingestion of an external resource into the segment based on the constraints.

18 Claims, 15 Drawing Sheets

| Classification String 204 | Unmarked | | | |
|---|---|---|---|---|
| Classification Level 214 | MTS | MS | MC | MU |
| Compartments 234 | Dialysis | Disease Diagnosis | Disease Treatment | |
| Dissemination Controls 244 | Authorized Official | Research Purposes | Treatment Purposes | Academic Purposes |
| Release Controls 254 | Experience Level | Geographic Location | Organization | |

Allowed Markings    264
Only the following markings are allowed in this segment and can be set as an access requirement:

| Patient Data | → | Kidney Research |
|---|---|---|
| Literature | | Kidney Patient Group |
| Pharmacy Data | | |

---

Hardware Processors 103

Process Engine 104
- Definition Engine 106 ---→ Enforcement Engine 108

114

202 —

Segment Access Control and Constraints

This segment has a maximum classification and 2 allowed markings.

Maximum Classification Level: MS (Secret)   212
Dissemination Controls: Research Purposes   242
Release Controls: Experience Level 5 years   252
Allowed Markings:    262
    Patient Data: Kidney Research
    Patient Data: Kidney Patient Group

FIGURE 2

ENFORCING SECURITY WITHIN A DATA PLATFORM

CROSS REFERENCE TO RELATED APPLICATIONS

This application claims the benefit under 35 U.S.C. § 119(e) of U.S. Provisional Application No. 63/214,734 filed Jun. 24, 2021, the content of which is incorporated by reference in its entirety into the present disclosure.

FIELD OF THE INVENTION

This disclosure relates to approaches of defining and enforcing data security in a data platform. For example, data security constraints may be enforced with a particular segment of the platform, and a manner of propagation of the data security constraints may be implemented throughout the platform.

BACKGROUND

As data proliferation has skyrocketed, the safeguarding of data from inadvertent or unauthorized disclosure has become increasingly crucial. Conventional approaches of maintaining data security within a data platform include implementing data controls to resources within the data platform, in order to enforce data governance. For example, certain resources may be classified as "top secret" and/or accessible only by certain users. However, in such approaches, certain implementation details may not be well-defined. In addition, such approaches may also fail to address defining and implementing data controls within individual segments or portions of the data platform.

SUMMARY

Various embodiments of the present disclosure can include computing systems, methods, and non-transitory computer readable media configured to implement security controls within a data platform. The computing systems may include one or more processors and memory storing instructions that, when executed by the one or more processors, cause the system to implement security controls within a data platform and a particular segment of the data platform.

The computing systems, methods, and non-transitory computer readable media may perform: defining, within the data platform, a segment having constraints at a level of the segment; implementing the constraints within the segment while insulating resources within the segment from inheriting the constraints or the classification rules; and controlling an ingestion of an external resource into the segment based on the constraints.

In some embodiments, the constraints include a maximum classification level defined within the segment. The maximum classification level indicates that ingesting a particular resource into the segment which exceeds the maximum classification level violates the constraints.

In some embodiments, the implementation of the constraints includes defining a mirrored user constraint based on the maximum classification level. The mirrored user constraint requires a user attempting to access a resource within the segment to have at least a clearance level corresponding to the maximum classification level.

In some embodiments, even if the resource within the segment has a classification level at or below a corresponding clearance level of the user, the mirrored user constraint prohibits the user from accessing the resource.

In some embodiments, the constraints further comprise a maximum classification that includes categories. The maximum classification defines a highest permitted level corresponding to each of the categories in order for a resource to conform with or satisfy the constraints.

In some embodiments, the categories include a general classification level, a dissemination control, and a release control. The controlling of an ingestion of an external resource into the segment includes: determining whether a corresponding general classification level of the external resource satisfies the general classification level indicated by the constraints; determining whether a corresponding dissemination control of the external resource satisfies the dissemination control indicated by the constraints; and determining whether a corresponding release control of the external resource satisfies the release control indicated by the constraints. In response to determining that the corresponding general classification level, the corresponding dissemination control, and the corresponding release control of the external resource satisfies the general classification level, the dissemination control, and the release control indicated by the constraints, the computing system may permit the ingestion of the external resource into the segment.

In some embodiments, the controlling of an ingestion of an external resource into the segment includes determining, for each of the categories, whether a corresponding level of the external resource, as indicated by one or more markings of the external resource, satisfies the highest permitted level indicated by the constraints. In response to determining that the corresponding level of the external resource satisfies the highest permitted level indicated by the constraints for each of the categories, the computing system permits the ingestion of the external resource into the segment.

In some embodiments, the controlling of an ingestion of an external resource into the segment includes: determining, for each of the categories, whether a corresponding level of the external resource, as indicated by one or more markings of the external resource, satisfies the highest permitted level indicated by the constraints. In response to determining that the corresponding level of the external resource fails to satisfy the highest permitted level indicated by the constraints for one of the categories, the computing system either: permits the ingestion of the external resource into the segment while issuing a flag indicating a category of which the corresponding level of the external resource exceeded the highest permitted level indicated by the constraints, or prohibits the ingestion of the external resource into the segment.

In some embodiments, the constraints include a conjunctive classification rule and a disjunctive classification rule. The implementation of the constraints comprises expanding the conjunctive classification rule to include implied hierarchical relationships among different levels associated with the conjunctive classification rule and enforcing the disjunctive classification rule conjunctively such that, a resource that includes only some but not all disjunctive features indicated in the disjunctive classification rule is deemed to fail to satisfy the constraints.

In some embodiments, the implementation of the constraints within the segment includes determining whether to propagate a change in a classification level of an upstream resource to the downstream resource within the segment, depending on whether the upstream resource is stored within the segment or within an other segment. The determination of whether to propagate may include: if the upstream resource is stored within the segment, propagating the change in the classification level to the upstream resource if a changed classification level complies with the constraints; and if the upstream resource is stored in an other segment, propagating the change in the classification level to the upstream resource if a changed classification level complies with the constraints and is compatible with a classification level of the downstream resource.

In some embodiments, the controlling of the ingestion of the external resource into the segment is based on a comparison between markings of the external resource and the constraints at the level of the segment; and in response to the external resource being unmarked (e.g., lacking any markings), determining that the external resource satisfies the constraints and permitting the ingestion of the external resource into the segment.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates an exemplary operation of selecting, defining, configuring, or setting data security controls and access controls, such as constraints and/or classification levels, within a segment of the data platform, in accordance with various embodiments.

In FIG. 4, resources that are prospectively being ingested into the segment are deemed to fail to satisfy the constraints and classification levels, in accordance with various embodiments.

In FIG. 11, the upstream resource exists within the same segment as downstream resources, in accordance with various embodiments.

In FIG. 13, the upstream resource exists within a different segment compared to downstream resources, in accordance with various embodiments.

DETAILED DESCRIPTION

Figure 1:
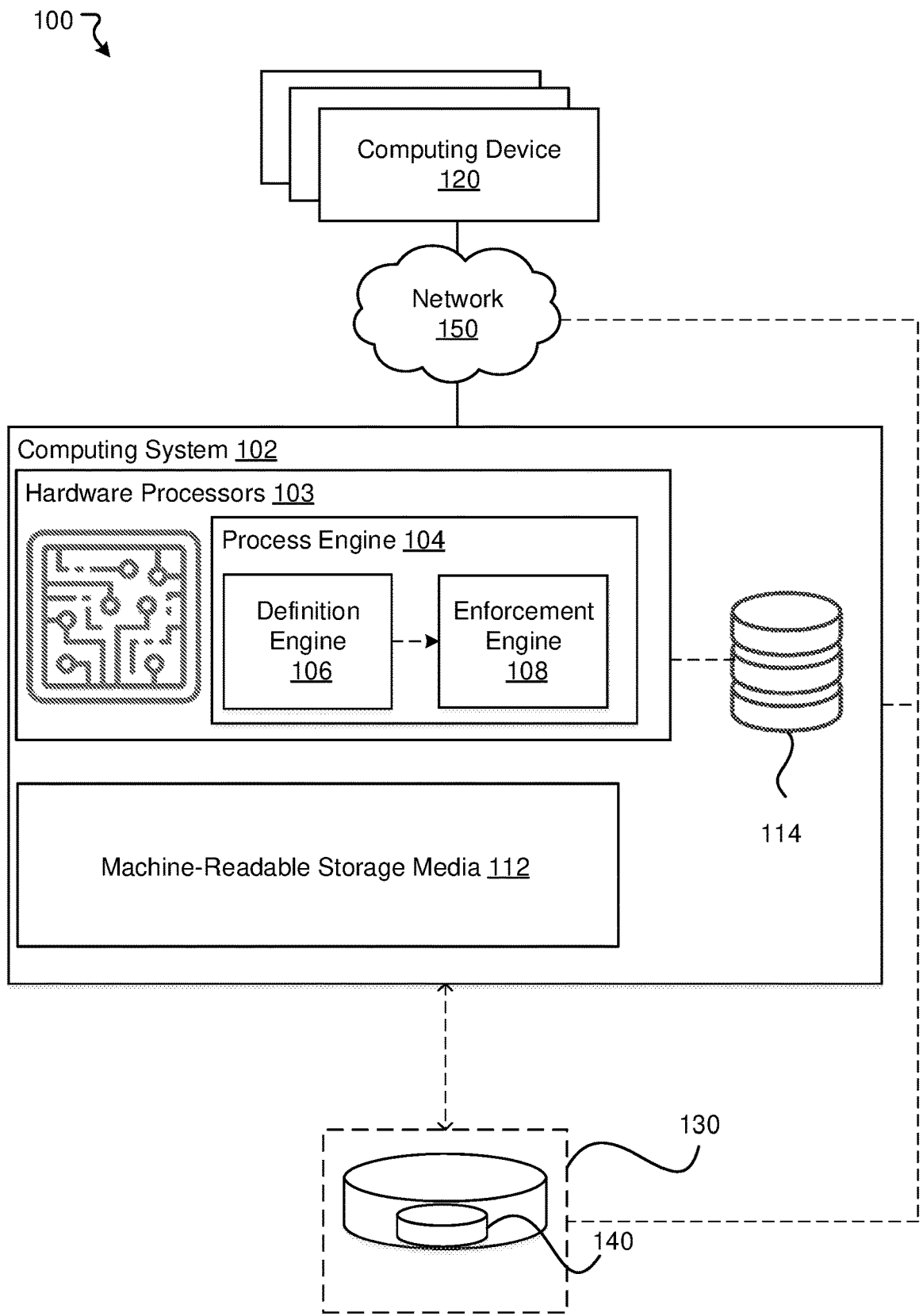
FIG. 1 illustrates an example environment of a computing system that implements data security controls and access controls in a data platform and portions or segments of a data platform, in accordance with various embodiments.

Conventional approaches of maintaining data security within a data platform may not have well-defined implementation details in certain aspects. For example, such approaches may be unable to implement different data security policies or constraints in different segments or portions of the data platform. Additionally, a manner in which data security controls or constraints are propagated from a given resource and/or from a given segment of the data platform may not be well-defined. Moreover, data security controls or constraints may currently be applied inconsistently across different segments or portions that include related datasets. Furthermore, certain other implementation details, such as, in scenarios where the data controls include both conjunctive and disjunctive constraints, may also lack well-defined procedures.

To address such shortcomings, a new approach includes, defining data security controls, including constraints and/or classification levels, within a segment, portion, subset, compartment, project, or a subspace (hereinafter "segment") of a data platform. In some embodiments, herein, constraints may also be construed as including classification levels, such as maximum classification levels, defined or permitted within a segment. Constraints may further refer to particular types or contents of data (e.g., resources) permitted within a segment, and particular designations or markings that are required, permitted, or prohibited for data within that segment. Additionally, constraints may refer to restrictions in addition to the classification levels, such as dissemination and release controls with that segment. Furthermore, constraints may refer to a clearance level and/or access privileges that a user has to satisfy in order to access data with that segment. The foregoing describes specific examples of constraints solely to elucidate concepts, but these examples are nonlimiting, and the specific constraints, such as dissemination, releasability, and classifications, may be flexibly configurable. One exemplary type of constraint may include the segment being particularly tailored to or restricted to store data of a particular type and/or for a particular purpose, such as, for cancer research. A computing system may coordinate the transfer or distribution of data to and from the segment in order to enforce, or ensure compliance with, the constraints and/or classification levels. For example, the computing system may include logic to ensure that a dataset would conform to the constraints and/or classification levels within the segment before permitting or authorizing the ingestion of the dataset into the segment. In another exemplary manifestation of such coordination, the computing system may include logic to determine whether, and/or to what degree, an entity (e.g., user) requesting access to a particular dataset within the segment is actually authorized to do so. As alluded to, the constraints and/or the classification levels may be set or defined on an individual segment, meaning that other segments, portions, or subspaces of the data platform external to the segment of the data platform may have different defined constraints and/or classification levels. The constraints and/or the classification levels at the segment may be insulated from resources within the segment, and/or downstream resources derived from the resources. Thus, the constraints and/or the classification levels at the segment may not propagate to or be inherited by the resources or the downstream resources. Herein, resources may refer to any data, datasets, data object(s), platforms (e.g., analysis platforms), repositories, logs, workbooks, spreadsheets, and/or a portion or subset thereof, within the data platform. The data may be manifested as a file, document, or other data entity.

FIG. 1 illustrates an example environment 100, in accordance with various embodiments, of a computing system that implements data security controls in a data platform and portions or segments of the data platform. The example environment 100 can include at least a computing system 102 and at least one computing device 120. The computing system 102 and the computing device 120 can each include one or more processors and memory. The processors can be configured to perform various operations by interpreting machine-readable instructions, for example, from a machine-readable storage media 112. The processors can include one or more hardware processors 103 of the computing system 102 that include logic which can be configured to define data security controls such as constraints and/or classifications in a segment 140 of one or more data platforms 130, and enforce the defined data security controls. Although one segment 140 is shown for purposes of simplicity, the one or more data platforms 130 may be understood to include multiple segments. Operations within each of the segments may be simultaneously coordinated and/or managed by the hardware processors in a same or similar manner as described with reference to the segment 140.

The data platform 130 may be divided into segments, such as the segment 140. The demarcation of resources in the data platform 130 into segments, such as the segment 140, provides clear delineations of classification levels and/or constraints of each of the segments. As a nonlimiting example, one segment may have a classification level of "confidential," while another segment may have a classification level of "top secret." A classification level of a segment may indicate or define a maximum classification level of resources that are permitted within the segment. In particular, if one segment has a classification level of "confidential," then resources classified up to and including, or, at or below a level of, "confidential" may be permitted to be ingested into the segment while resources classified at a level higher than "confidential" may be blocked or restricted from being ingested into the segment. Additionally or alternatively, each segment may be particularly tailored to or restricted to storage and management of resources having a particular purpose and/or of a particular subject matter. As an illustrative example, the segment 140 may include resources of cancer research subject matter. The segment 140 may further include sub-segments that individually include lymphoma and leukemia subject matter. Such a merging of lymphoma and leukemia resources within the segment 140 may be desirable, for example, in collaborative scenarios. Alternatively, the segment 140 may include lymphoma resources, while another segment includes leukemia resources. Such segregation of lymphoma and leukemia resources in different segments may be desirable in scenarios in which access to, dissemination, and/or release of lymphoma resources are to be determined and managed separately from those of leukemia resources.

As shown in FIG. 1, the one or more hardware processors 103 can include a process engine 104 which may include and carry out the logic of the hardware processors 103. The process engine 104 may include a definition engine 106 and an enforcement engine 108. The process engine 104 may be executed by the hardware processors 103 of the computing system 102 to perform various operations including those operations described in reference to the definition engine 106 and the enforcement engine 108. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the definition engine 106 and the enforcement engine 108 may be implemented in one or more computing systems and/or devices. In general, the definition engine 106 may include instructions or logic to properly set constraints and/or classification levels within the segment 140. In some embodiments, the definition engine 106 may receive an input of constraints and/or classification levels, evaluate and/or validate the input to determine whether the input matches existing stored constraints and/or classification levels (e.g., if the input is "top top secret," such an input is not validated because "top top secret" is not stored as a possible classification level), and set the constraints and/or classification levels according to the input. In some embodiments, the definition engine 106 may generate, with or without input, constraints and/or classification levels of the segment 140 based on previous constraints and/or classification levels of other similar or related segments, for example, of similar subject matter and/or types of resources. For example, if the segment 140 includes resources of medical data such as lung cancer data, the definition engine 106 may generate constraints and/or classification levels of the segment 140 to be same or similar as those in other segments that include resources of other medical data such as pancreatic cancer data. The generated constraints and/or classification levels of the segment 140 may be modified.

Meanwhile, the enforcement engine 108 may include instructions or logic to ensure that a request to ingest a resource into the segment 140 is proper and conforms to the constraints and/or classification levels defined by the definition engine 106. In some embodiments, the enforcement engine 108 may ensure that a resource would conform to the constraints and/or classification levels within the segment 140 before permitting or authorizing the ingestion of the resource into the segment 140. Although much of the foregoing description focuses on prohibiting the import or ingestion of data into the segment 140 that violates the constraints and/or classification levels defined for the segment 140, in some embodiments, the enforcement engine 108 may still permit the ingestion of a resource that violates such constraints and/or classification levels, but rather, outputs a warning or flag. Thus, in the subsequent FIGURES, any embodiment that refers to prohibiting or not permitting the ingestion of a resource into the segment 140 may alternatively be implemented to still permit the ingestion of a resource into the segment 140, but rather, output a warning or flag.

Additionally, the enforcement engine 108 may ensure that a user requesting the ingestion of a resource has appropriate editing permissions or authorization on that resource. In another exemplary manifestation of such instructions or logic, the enforcement engine 108 may determine whether, and/or to what degree, an entity (e.g., a user) requesting access to a particular resource within the segment is actually authorized to do so. For example, the enforcement engine 108 may determine that even though a user satisfies a clearance level corresponding to a classification of the segment 140, as defined by the definition engine 106, the user may not satisfy a dissemination or release control. In such a scenario, the enforcement engine 108 may restrict the user from accessing the segment 140. Such restriction may be manifested as prohibiting the user from viewing or editing contents of resources within the segment 140, prohibiting the user from viewing an existence of resources within the segment 140, and/or generating tearlines to purge contents of resource portions that fail to satisfy a dissemination or release control. Further details and examples will be described with respect to the subsequent FIGURES below.

In some embodiments, the computing system 102 may further include a database or other storage (hereinafter "database") 114 associated with the hardware processors 103. In some embodiments, the database 114 may be integrated internally with the hardware processors 103. In other embodiments, the database 114 may be separate from but communicatively connected to the hardware processors 103. The database 114 may store information such as commands, protocols, or rules regarding constraints and/or classification levels so that the definition engine 106 may properly identify, set, and/or define constraints and/or classification levels, to be enforced by the enforcement engine 108. For example, the database 114 may store information of or regarding a hierarchy of classification levels, dissemination controls, and release controls. As an illustrative example, the database 114 may store information indicating that "top secret" is a highest level of classification, followed successively by "secret," "confidential," and "unclassified." As a further example, the database 114 may store information indicating degrees of restriction of the dissemination and/or release controls, and any dissemination and/or release controls which may be wholly encompassed by other dissemination and/or release controls. For instance, a release control or restriction stipulating that a segment can only be released to an entity that satisfies a particular experience level may wholly encompass (e.g., automatically include) a dissemination control stipulating that distribution may only be done with approval of an authorized official. In such a scenario, a protocol or rule, as stored in the database 114, may have specified that a determination of whether an entity satisfies a particular experience level can only be done by an authorized official. Thus, identifying both of the aforementioned dissemination controls may be redundant. The database 114 may further store information indicating how a classification level, dissemination, and/or release controls are determined in scenarios of commingling of data at a portion level (e.g., only a portion of a dataset), and precedence rules at a banner level (e.g., the entire dataset) if the dataset includes portions that have different classification levels, dissemination, and/or release controls. The database 114 may further include rules or logic to infer classification levels on unmarked resources, or resources which do not have a marked classification level, based on one or more sources of the unmarked resources. The database 114 may further include rules or logic to determine a classification level and constraints of a reference or a link to a different resource on a different segment, or to the different segment itself. Such a classification level and constraints may be determined by the classification level and constraints of the different resource, or that of the different segment itself. The database 114 may further store information of constraints and classification levels of each segment, including the segment 140, of the data platform 130, and/or log an evolution or history of the constraints and classification levels of each segment along with resources with each segment. For example, a change in the maximum classification level of the segment 140 from "secret" to "top secret" may be logged in the database 114.

In general, an entity or a user operating a computing device 120 can interact with the computing system 102 over the network 150, for example, through one or more graphical user interfaces and/or application programming interfaces. In some instances, one or more of the definition engine 106 and the enforcement engine 108 may be combined or integrated into a single processor, and some or all functions performed by one or more of the aforementioned engines may not be spatially separated, but instead may be performed by a common processor. Any functions attributed to the definition engine 106 are not to be strictly interpreted as limited to being performed by the definition engine 106, but may also be performed by the enforcement engine 108. Likewise, any functions attributed to the enforcement engine 108 are not to be strictly interpreted as limited to being performed by the enforcement engine 108, but may also be performed by the definition engine 106.

The process engine 104 can be configured to define, implement, and/or modify the ingestion and access of resources within the data platform 130, based at least in part on access controls such as classification levels, markings, and further dissemination and/or release protocols or controls of resources. In some embodiments, the process engine 104 (more particularly, the enforcement engine 108) may process requests received from the computing device 120 according to the access controls and further dissemination and/or release protocols or controls as defined by the definition engine 106. For example, the requests may be generated based on operations performed by a user operating the computing device 120 or from a software application or embedded machine running on the computing device 120. In various embodiments, such requests may include requests to ingest, analyze, access, view, and/or process resources using the data platform 130. Such requests may also include requests to change security control settings, such as existing access controls, constraints and/or classification levels, in the data platform 130. In some embodiments, such requests may be confined to a particular segment, such as the segment 140. For example, a user may request access to a particular type or category of resources such as leukemia data, and the enforcement engine 108 may determine which segment the user may have access to. In particular, the enforcement engine 108 may determine, to what extent, the user has access to the leukemia data in a particular segment, such as the segment 140, that stores the leukemia data. The enforcement engine 108 may also restrict the user from accessing other segments. Such restriction may be based, for example, on a clearance or classification level or other classification attribute of the user, such as, whether the user is particularly designated or approved for a particular purpose or project. As another example, a user may directly request access to a particular segment, such as the segment 140, and the enforcement engine 108 may determine to what extent the user has access to the segment 140. As another example, a user may request an import or ingestion of a resource into the segment 140. The enforcement engine 108 may validate that the user has appropriate edit permissions on that resource and that the resource satisfies the constraints and classification levels of the segment 140.

FIG. 2 illustrates an exemplary operation of the definition engine 106. The definition engine 106 may define, configure, or set data security controls and access controls, such as constraints and/or classification levels, within the segment 140. At least some of the constraints and classification levels may be in accordance with Classification Based Access Controls (CBAC). The constraints and/or classification levels may be inputted, defined, and/or modified, by a user, for example, of the computing device 120, using an editing window or window (hereinafter "window") 201. The window 201 may include exemplary categories, to be populated using fields, corresponding to a classification string 204, a classification level 214, compartments 234, dissemination controls 244, release controls 254, and allowed markings 264. Some or all of the aforementioned fields may correspond to a different category or type of constraints or classification levels. The aforementioned categories and fields are not to be construed as limiting; other categories or fields may additionally be defined. In particular, the specific populated fields, such as "Dialysis" for compartments 234, "authorized official" for dissemination controls 244, and "experience level" for release controls 254, are not limited to the ones shown in FIG. 2 and other subsequent FIGURES, and may be flexibly configurable. In some embodiments, a subset (e.g., some or all) of the fields may be set or defined either during a creation or introduction of the segment 140 or after the creation or introduction of the segment 140. In some embodiments, the allowed markings 264 may not be set or defined during the creation or introduction of the segment 140, but only through a separate process following the creation or introduction of the segment 140. Each of the corresponding fields may include a drop-down menu, a combo box, a list box, an editable field, a natural language interface, a question-and-answer interface, or a form-fill interface to receive selections and/or inputs. The classification string 204 may indicate a manner or format in which a classification level, dissemination controls, and release controls are designated, either as a portion marking or a banner marking. For example, the classification string 204 may indicate delimiters, such as one or more slashes, used to separate an indication of a classification level from an indication of a dissemination control or release control. In some embodiments, the classification level 214, the dissemination controls 244, and/or the release controls 254 may all be defined in terms of, and/or part of, a maximum classification of the segment 140, such that only resources at or below each of the levels set according to the classification level 214, the dissemination controls 244, and/or the release controls 254 may be permitted or ingested into the segment 140. Herein, a maximum classification or classification may be understood to encompass any or all of a classification level (e.g., 214), dissemination controls (e.g., 244), and release controls (e.g., 254), whereas a classification level may refer solely to a general classification alone (e.g., the classification level 214, such as "secret") without the dissemination controls and release controls. The maximum classification may include additional categories not shown in FIG. 2 or in subsequent FIGS. 3-13, and may be configurable. The maximum classification, and other constraints of the segment 140, may not apply to a scenario of exporting or moving resources out of the segment 140. Such a function may be controlled by a permission of a user seeking to perform such a function along with constraints and classification levels of a destination segment to which the resources are being exported. If the resources fail to comply with defined constraints and classification levels of the destination segment, then the enforcement engine 108 may output a prompt or interface that the destination segment is invalid, or may prohibit export to the destination segment by blocking or preventing a selection of the destination segment.

As previously alluded to, the classification level 214 may include a maximum classification level, which may also be known as a general classification. The maximum classification level may specify that resources up to and including that classification level are permitted in the segment 140, while resources exceeding the maximum classification level are not permitted in the segment 140. As shown in FIG. 2, the classification level 214 may include options of a "top secret," "secret," "confidential," and "unclassified" maximum classification level. The maximum classification level may be conjunctive in nature. For example, a maximum classification level of "secret" may be expanded to include "secret," "confidential," or unclassified" as permitted classification levels, but exclude "top secret."

In some embodiments, when a maximum classification (e.g., including the general classification, dissemination controls, and release controls) is defined, the definition engine 106 may additionally define a mirrored user constraint. For example, the mirrored user constraint may include a requirement or restriction that a user has at least a clearance level corresponding to the maximum classification in order to access the segment 140. Thus, a mirrored user constraint may include a classification level, dissemination controls and release controls. In a particular scenario in which the maximum classification level for a resource to exist within the segment 140 is "secret," only users having a clearance level of "secret" or "top secret" are permitted to access the segment 140, but users having a clearance level of "confidential" are entirely precluded from accessing the segment 140. A user may be permitted to access a segment having a maximum classification level at or below the clearance level of that user, but prohibited from accessing a segment having a maximum classification level above the clearance level of that user. Thus, the mirrored user constraint results in a user sometimes being precluded from a segment even if that user is requesting access to an individual resource within the segment that is at or below the clearance level of that user. For example, if the maximum classification level for the segment is "secret," a user having a clearance level of "confidential" or "unclassified" would still be unable to access a particular resource having a classification level of "unclassified" if that particular resource exists within the segment 140.

In other embodiments, a corresponding user constraint may be set to be higher than the maximum classification. For example, in a particular scenario in which the maximum classification level for a resource to exist within the segment 140 is "secret," only users having a clearance level of "top secret" may be permitted to access the segment 140. In some embodiments, additionally or alternatively, the definition engine 106 may receive an input from an other user regarding which users or types of users may access the segment 140. Herein, accessing a resource may refer to seeing an existence of the resource and/or viewing contents of the resource.

A mirrored user constraint may or may not apply to a scenario of a user requesting an import or ingestion of a resource into the segment 140. In some embodiments, resources that cannot be imported or ingested into the segment 140 may be greyed out so that a user would be unable to select those resources to be ingested into the segment 140. A resource, or the segment 140, being greyed out, may refer to functions, such as selection, import, or access, being unavailable, disabled, or inactive.

The enforcement engine 108 may determine which resources cannot be imported or ingested into the segment 140 based on classification levels and constraints of, or associated with, those resources, a classification level of a user, and/or editing privileges of a user on those resources. In a scenario in which a user has a classification level (e.g., "confidential") below the classification level corresponding to the mirrored user constraint (e.g., "secret" or "top secret"), that user may, or may not, still request an import or ingestion of that resource into the segment 140. In some embodiments, that user may be blocked or prohibited from edit access or privileges to the segment 140. In some examples, that user may not even see an existence of the segment 140 due to the classification level of the user (e.g., "confidential") being below the classification level corresponding to the mirrored user constraint.

The compartments 234 may indicate further demarcations of resources within the segment 140. In some embodiments, if the segment 140 contains resources of, or pertaining to, a particular field, each of the compartments 234 may include sub-fields, or specialties, within the particular field. As a non-limiting example, as illustrated in FIG. 2, if the segment 140 includes resources of or pertaining to kidneys, the compartments 234 may include resources of or pertaining to dialysis, disease diagnosis, or disease treatment. Additionally or alternatively, the compartments 234 may be used to store resources having a more specific classification level, dissemination controls, and/or release controls than those defined more generally for the segment 140. For example, if the classification level 214 in the segment 140 is "top secret," indicating that resources having a classification level of or including "top secret" is permitted within the segment 140, then one of the compartments 234 may be restricted to only including resources having a "top secret" classification level. Other compartments may be restricted only to resources having one particular classification level. In other embodiments, the compartments 234 may store resources that have special processing and/or storage requirements, such as resources containing sensitive data. The specific labels (e.g., "dialysis") within the compartments 234 may be flexibly configurable and are not limited to the ones shown in FIG. 2.

Next, the dissemination controls 244 may include restrictions on what types of resources are permitted into the segment 140, based on the dissemination rules or policies of the resources. The dissemination rules or policies of a particular resource may indicate expansions or limitations on distribution of the particular resource, in addition to a classification level of that resource. In some embodiments, the dissemination rules or policies may include criteria of specific categories or types of entities authorized to access the particular resource, and/or a manner or protocol of determining which entities are authorized to access the particular resource. As a non-limiting example, the dissemination rules or policies may indicate or stipulate that dissemination of a particular resource is to be regulated by, or require approval from, an authorized official. Other possible non-limiting dissemination rules or policies may include restricting the dissemination of a particular resource to research purposes, treatment purposes, or academic purposes. Thus, the dissemination controls 244 may permit only certain resources having particular dissemination rules or policies, or resources having no dissemination rules or policies beyond the classification level 214, to be ingested into the segment 140. For example, the dissemination controls 244 may indicate that only resources having, and/or being marked as having, particular dissemination rules or policies, or any less restrictive dissemination rules or policies compared to the particular dissemination rules or policies, may be ingested into the segment 140. The specific labels (e.g., "authorized official") within the dissemination controls 244 are not limited to the ones shown in FIG. 2 and may be flexibly configurable.

As illustrated in FIG. 2, a selection of "authorized official" as a dissemination control may mean that, in order for a particular resource to be permitted into the segment 140, the particular resource requires a marking that indicates dissemination of that resource requires authorization from an official. In some examples, any resource having a less restrictive dissemination rule or policy, or a rule or policy that requires either authorization from an official or some other authorization, or no dissemination rule or policy, may also be permitted into the segment 140. As another illustrative example relating to FIG. 2, a selection of "research purposes" as a dissemination control may mean that, in order for a particular resource to be permitted into the segment 140, the particular resource requires a marking that indicates dissemination of that resource is limited to research purposes. In some examples, any resource having a less restrictive dissemination rule or policy, or no dissemination rule or policy, may also be permitted into the segment 140. For example, a resource marked to indicate that it may be disseminated for research or clinical purposes would be a less restrictive dissemination rule or policy, and would be permitted into the segment 140.

The release controls 254 may include further restrictions on what types of resources are permitted into the segment 140, based on the rules or policies associated with release of the resources. The release rules or policies of a particular resource may indicate expansions or limitations on release of the particular resource, in addition to the classification level and dissemination rules or policies of that resource. In some embodiments, the release rules or policies may include criteria of specific types of entities to which the particular resource may be released. For example, the release rules or policies may indicate or stipulate that dissemination of a particular resource is permitted for, or limited to, either enumerated entities, or particular types of categories of entities, such as, entities having a particular level or amount of experience, entities within a particular geographic location, or entities affiliated or associated with a particular organization. Thus, the release controls 254 may permit only certain resources having particular release rules or policies, or resources having release rules or policies that are no more restrictive than the particular release rules or policies, to be ingested into the segment 140. For example, the release controls 254 may indicate that only resources having, and/or being marked as having, particular release rules or policies, or any less restrictive release rules or policies compared to the particular release rules or policies, may be ingested into the segment 140. As illustrated in FIG. 2, a selection of "experience level" as a release control may mean that, in order for a particular resource to be permitted into the segment 140, the particular resource requires a marking that indicates release of that resource is limited to entities having a certain experience level or amount of experience (e.g., releasable to entities having at least 5 years). In some examples, any resource having a less restrictive release rule or policy (e.g., releasable to entities having at least 3 years of experience), or no release rule or policy, may also be permitted into the segment 140. As another illustrative example relating to FIG. 2, a selection of "geographic location" as a release control may mean that, in order for a particular resource to be permitted into the segment 140, the particular resource requires a marking that indicates dissemination of that resource is limited to entities within a particular geographic location (e.g., releasable to the Midwest). In some examples, any resource having a less restrictive release rule or policy (e.g., releasable to either the Midwest or the Mid-Atlantic), or no release rule or policy, may also be permitted into the segment 140. Thus, the dissemination controls 244 and release controls 254 further restrict which resources may be permitted into the segment 140. In some embodiments, any or all of the dissemination controls 244 and release controls 254 may be defined in a disjunctive manner, and may be evaluated or enforced conjunctively, as will be further described with respect to FIGS. 5-6. The specific labels (e.g., "geographic location") within the release controls 254 are not limited to the ones shown in FIG. 2 and may be flexibly configurable.

The allowed markings 264 may indicate markings that are allowed or permitted in order for a resource to be permitted in the segment 140. Markings may refer to identifiers of a resource that indicate a subject matter or attribute of the resource. One example of an allowed marking may be "Personally Identifiable Information (PII)." If PII is the only allowed marking, then a resource marked with PII, or no marking at all, may be permitted into the segment 140. However, a resource that has another marking besides "PII" would not be permitted into the segment 140. As illustrated in FIG. 2, the allowed markings 264 may also include sub-markings. For example, upon selecting "Patient Data," further sub-markings may include "Kidney Research" and "Kidney Patient Group." Thus, in some examples, if "Patient Data" and "Kidney Research" were selected, then a resource would have to have "Patient Data" in conjunction with "Kidney Research" markings, or no marking at all, in order to be permitted into the segment 140. If a resource only has a "Patient Data" marking, that resource would not be permitted into the segment 140. In other examples, if "Patient Data" and "Kidney Research" were selected, then a resource could have either "Patient Data," "Patient Data" in conjunction with "Kidney Research," or no marking at all, to be permitted into the segment 140. In some embodiments, if the allowed markings 264 are enabled but no specific marking is defined for the segment 140, then only unmarked resources are permitted into the segment 140. The specific labels (e.g., "Patient Data") within the allowed markings 264 are not limited to the ones shown in FIG. 2 and may be flexibly configurable.

In some embodiments, additionally or alternatively, the window 201 may further include a selection of required markings and prohibited markings that indicate markings that are required or prohibited on a resource in order for that resource to be permitted in the segment 140. Examples of prohibited markings may include, prohibiting any resource marked with PII, or marked with (PII or Beta), from being ingested into the segment 140. Herein, Beta may refer to a placeholder name. Examples of required markings may include, requiring that any resource in the segment be marked with PII, or marked with (PII or Beta). In some embodiments, the required, allowed and prohibited markings are defined such that unmarked resources would also satisfy any constraints corresponding to the required, allowed and prohibited markings. For example, even an unmarked resource would satisfy constraints that define required markings, such as, a constraint requiring a resource to have a marking of "PII." Herein, an unmarked resource may refer to a resource lacking both identifiers and a classification level.

The constraints and/or classification levels as defined in the window 201 may be insulated from resources within the segment 140, and/or downstream resources derived from the resources within the segment 140. Thus, the constraints and/or the classification levels at the level of the segment 140 may be prevented from propagating to or being inherited by the resources or the downstream resources. Herein, a downstream resource of a resource (e.g., resource A) may refer to a modified or processed resource generated from the resource A, or a result of an analysis carried out on the resource A. For example, a modified or processed resource may be generated by removing and/or reformatting certain entries from the resource A.

To elucidate this separation or insulation between the classification level at a perspective of the segment 140 compared to a classification level at a perspective of a resource, if the segment 140 has a maximum defined classification level of "secret," the resources within the segment 140 do not necessary need to be classified at a "secret" level, nor would resources derived from the resources necessarily need to be classified at a "secret" level. Such separation or insulation would prevent overclassification. The same principle holds true for other constraints such as dissemination controls and release controls.

FIG. 2 further illustrates a panel 202 that manifests or indicates a configuration of the constraints and classification levels of the segment 140, as configured or defined in the window 201. The panel 202 may be generated or populated, in response to the definition engine 106 receiving a selection or input of the constraints and classification levels from the window 201. The panel 202 may be manifested as an interface, such as a tooltip, pop-out menu, popup window, or a hover box. The panel 202, or information from the panel 202, may be accessed or accessible from either a perspective of the segment 140 or at a perspective of a resource in the segment 140. Thus, information from the panel 202 may be visible or accessible either upon selection of the segment 140 or a selection of a resource within the segment 140. In some embodiments, a full configuration of all the constraints and classification levels of the segment 140 may not be visible to certain users viewing the panel 202.

The panel 202 may include an indication of whether the segment 140 has a maximum permitted classification level, and a number (e.g. count) of allowed markings, permitted markings, and/or prohibited markings. The panel 202 may further indicate a number of constraints and classification levels that a particular user may be unable to view. In particular, the panel 202 may indicate that a maximum classification level 212 is "secret." The panel 202 may further indicate that a permitted or maximum level of dissemination controls 242 is that dissemination of a resource is to be limited to research purposes. Thus, in some embodiments, any resource ingested into the segment 140 is required to have a dissemination status or restriction such that dissemination of that resource is limited to research purposes. In other embodiments, any resource ingested into the segment 140 may have the aforementioned dissemination restriction or any less restrictive dissemination restriction, in which scenario a resource having no dissemination restrictions would also be permitted into the segment 140. The specific fields populated in the panel 202 are not limited to those shown in FIG. 2 and are flexibly configurable.

Alternatively, assume that "authorized official" were selected in the dissemination controls 244 of the window 201. In such a scenario, the panel 202 may further indicate that a permitted or maximum level of dissemination controls 242 is that dissemination of a resource is to be approved by an authorized official. Thus, in some embodiments, any resource ingested into the segment 140 is required to have a dissemination status or restriction such that dissemination of that resource needs to be approved by an authorized official. In other embodiments, any resource ingested into the segment 140 may have the aforementioned dissemination status or any less restrictive dissemination status or restriction, in which scenario a resource having no dissemination restrictions would also be permitted into the segment 140.

The panel 202 may further indicate that a permitted or maximum level of release controls 252 is that release of a resource is dependent or based on an experience level of an entity requesting that resource. In the specific implementation of FIG. 2, the experience level is five years. Thus, in some embodiments, any resource ingested into the segment 140 is required to have a release restriction such that release of that resource is limited to entities having at least five years of experience. In other embodiments, any resource ingested into the segment 140 may have the aforementioned release restriction or any less restrictive release restriction, in which scenario a resource having a release restriction that limits its release to entities having four, three, two, one, or no years of experience (e.g., anywhere between zero and five years of experience) would also be permitted into the segment 140. The panel 202 may further indicate that the allowed markings 262 on a resource that is ingested into the segment 140 are limited to "patient data: kidney research" and "patient data: kidney patient group." In some embodiments, a resource is required to have both of the allowed markings "patient data: kidney research" and "patient data: kidney patient group," or no marking at all, in order to be permitted into the segment 140. In other embodiments, a resource is required to have either one of the allowed markings, both of the allowed markings, or no marking at all to be permitted into the segment 140.

Figure 3:
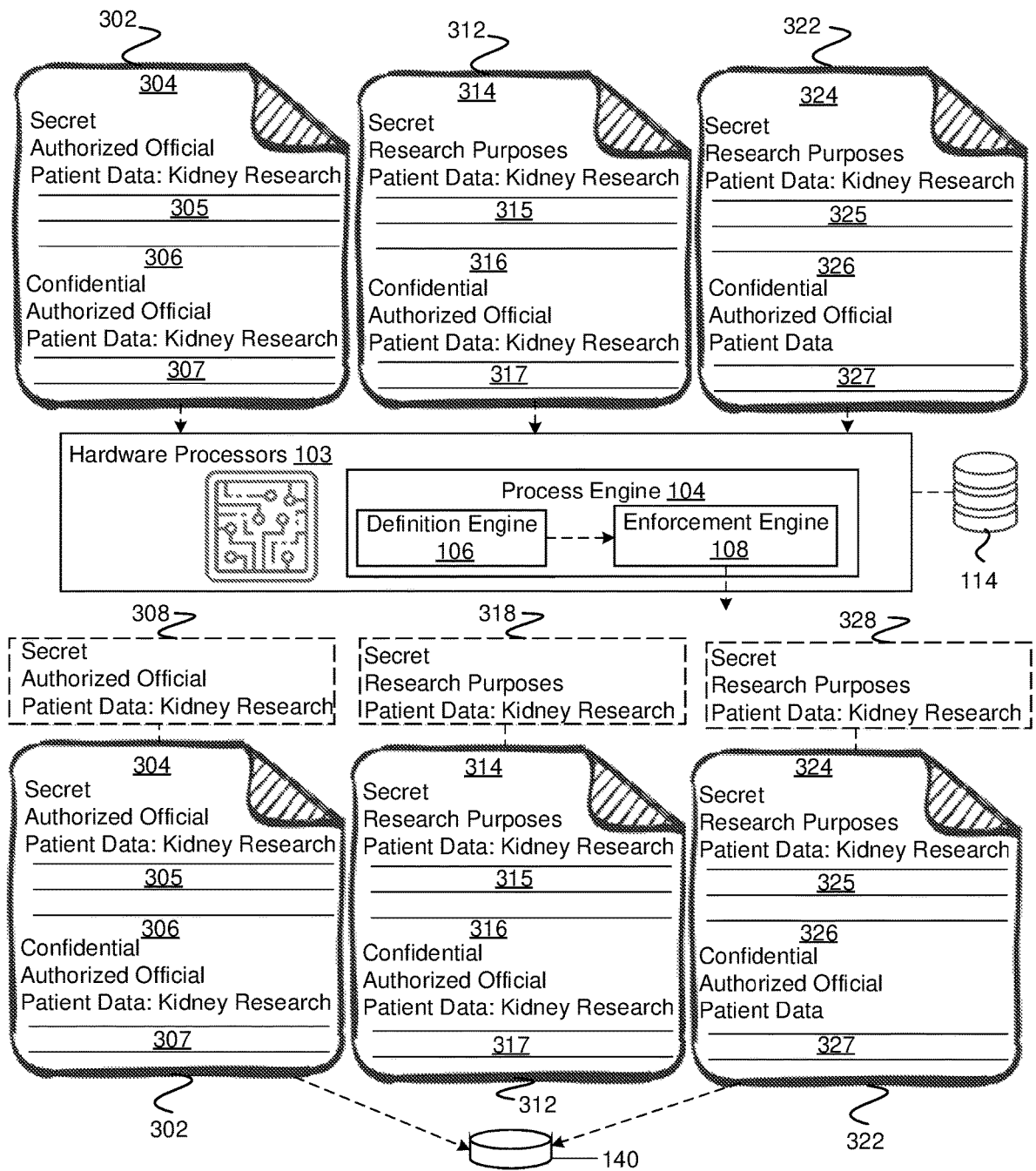
FIG. 3 illustrates an exemplary operation of enforcing or implementing the data security controls and access controls as defined with reference to FIG. 2, in accordance with various embodiments.

FIG. 3 illustrates an implementation of the enforcement engine 108 to enforce or implement data security controls and access controls such as constraints and classification levels defined by the definition engine 106 according to the window 201 and the panel 202 of FIG. 2. In FIG. 3, the enforcement engine 108 may determine whether or not a resource 302, 312, 322 is permitted to be ingested into the segment 140 based on its individual constraints or classifications. In some embodiments, an entity may have requested that the resource 302, 312, 322 be ingested into the segment 140, either from another segment or as a newly created resource.

In particular, the enforcement engine 108 may determine or validate whether a resource satisfies a maximum classification (e.g., a general classification, dissemination controls, and release controls) defined for the segment 140, along with other constraints such as allowed, prohibited, and/or mandatory markings, to determine whether that resource may be ingested into the segment 140. For example, the enforcement engine 108 may split up the classification levels and constraints by category (e.g., general classification, dissemination controls, and release control) and by constraint type on both the segment 140 and the resource. For each category, the enforcement engine 108 may expand any implied relationships within the classification levels and constraints on both the segment 140 and the resource. For example, implied relationships may include hierarchical relationships, such as, a maximum classification level of "top secret" would be expanded to include "top secret," "secret," "confidential," and "unclassified." The enforcement engine 108 may then regroup or recombine the classification levels and constraints by categories, on both the segment 140 and the resource. Each category on the segment 140 may be compared to each respective category on the resource. If each category on the resource satisfies a corresponding constraint or classification level of the respective category on the segment 140, then the resource may be successfully validated to be ingested into the segment 140. In some embodiments, if a resource is unmarked, or lacks a marking indicating a classification level of that resource, the enforcement engine 108 may infer a classification level of that resource based on one or more sources from which that resource was generated. In some embodiments, the enforcement engine 108 may query a user to confirm the inferred classification level. If the inferred classification level is confirmed, the enforcement engine 108 may determine whether that resource may be ingested into the segment 140 based at least in part on the inferred classification level. As described below and in FIGS. 3, 4, 6, and 7, particular examples of determining whether a resource satisfies all constraints and classification levels defined for the segment 140 are provided.

The resource 302 may include portion markings 304, 306 indicating constraints and classification levels of respective portions 305, 307 of the resource 302. The constraints and classification levels may be in accordance with CBAC. In particular, the portion marking 304 may indicate that the portion 305 is classified at a level of "secret". In other embodiments, the portion marking 304 may further indicate a different classification level of the portion 305. Referring back to FIG. 3, the portion marking 304 may further indicate that an authorized official is required to approve any dissemination of the portion 305, and that the portion 305 has been marked or tagged with an identifier "Patient Data: Kidney Research."

The portion marking 306 may indicate that the portion 307 is classified at a level of "confidential", that an authorized official is required to approve any dissemination of the portion 307, and that the portion 307 has been marked or tagged with an identifier "Patient Data: Kidney Research." The enforcement engine 108 may generate a banner marking 308 that provides overall constraints or classifications of the entire resource 302 by integrating individual portion markings 304, 306 of each of the portions 305, 307.

To briefly describe a concept of banner markings, in some embodiments, the banner marking 308 includes most restrictive constraints or classifications out of all portions of the resource 302, may be determined based on precedence of classification levels and constraints and/or includes controls or classifications that overlap across all portions of the resource 302. In some examples, the banner marking corresponding to dissemination controls would be determined according to logic, protocols, or rules stored in the database 114. In particular, if the logic specifies that "research purposes" is more restrictive than "authorized official" because "research purposes" automatically requires an authorized official to determine that a resource is actually being used for research purposes, then the banner marking would indicate "research purposes." However, if the logic fails to specify a hierarchical relationship between "research purposes and "authorized official" (e.g., no definition that one is more restrictive than the other and/or entirely encompassed within the other), then other rules of precedence and/or nomenclature may be used to determine what the banner marking would indicate. For example, in that scenario, the banner marking may indicate both aforementioned dissemination controls, one of the aforementioned dissemination controls, or a different dissemination control that may encompass both aforementioned dissemination controls. Assume, hereinafter, for the sake of example, that according to logic stored in the database 114, "research purposes" is more restrictive than "authorized official."

The banner marking 308 here may indicate that the resource 302 has an overall classification level of "secret", that dissemination is to be authorized by an authorized official, and that the resource 302 is marked or tagged with "Patient Data: Kidney Research."

To determine whether the resource 302 is permitted to be ingested into the segment 140, the enforcement engine 108 may compare the banner marking 308 to the permitted constraints and classification levels indicated in the panel 202 and as defined, for example, via the window 201. Because the classification level of the resource 302 matches the maximum permitted classification level 212 indicated in the panel 202, the dissemination control of "authorized official" is less restrictive than the maximum permitted dissemination control 242 of "research purposes," and the marking of the resource 302 matches one of the allowed markings 262, the resource 302 may be permitted to be ingested into the segment 140. Herein, the dissemination controls 242 are to be construed as the maximum permitted level of dissemination controls. However, in some scenarios, the dissemination controls 242 may be construed as limited to only specific enumerated dissemination controls, meaning that even less restrictive dissemination controls in a resource would disqualify that resource from ingestion into the segment 140. In that scenario, the resource 302 would not be permitted to be ingested into the segment 140 because "authorized official" does not match "research purposes."

The enforcement engine 108 may determine whether or not the resources 312, 322 are permitted to be ingested into the segment 140 using a same or similar manner as described above with respect to the resource 302. The resource 312 may include portion markings 314, 316 indicating constraints and classification levels of respective portions 315, 317 of the resource 312. In particular, the portion marking 314 may indicate that the portion 315 is classified at a level of "secret". The portion marking 314 may further indicate that any dissemination of the portion 315 is limited to research purposes, and that the portion 315 has been marked or tagged with an identifier "Patient Data: Kidney Research." The portion marking 316 may indicate that the portion 317 is classified at a level of "confidential," that any dissemination of the portion 317 requires approval by an authorized official, and that the portion 317 has been marked or tagged with an identifier "Patient Data: Kidney Research." The enforcement engine 108 may generate a banner marking 318 to indicate that an overall constraint or classification of the entire resource 312 includes a classification level of "secret", that any dissemination of the resource 312 is limited to research purposes, and that the resource 312 has been marked or tagged with an identifier "Patient Data: Kidney Research." The enforcement engine 108 may determine that the classification level of the resource 312 satisfies the maximum permitted classification level 212 as indicated in the panel 201 and prohibit the ingestion of the resource 312 into the segment 140. However, any other resource that has a "top secret" classification level would exceed the maximum permitted classification level 212 and be prohibited from ingestion into the segment 140.

The resource 322 may include portion markings 324, 326 indicating constraints and classification levels of respective portions 325, 327 of the resource 322. In particular, the portion marking 324 may indicate that the portion 325 is classified at a level of "secret". The portion marking 324 may further indicate that any dissemination of the portion 325 is limited to research purposes, and that the portion 325 has been marked or tagged with an identifier "Patient Data: Kidney Research." The portion marking 326 may indicate that the portion 327 is classified at a level of "confidential", that any dissemination of the portion 327 requires approval by an authorized official, and that the portion 327 has been marked or tagged with an identifier "Patient Data." The enforcement engine 108 may generate a banner marking 328 to indicate that an overall constraint or classification level of the entire resource 322 includes a classification level of "secret", that any dissemination of the resource 322 is limited to research purposes, and that the resource 322 has been marked or tagged with an identifier "Patient Data: Kidney Research." The enforcement engine 108 may determine that "Patient Data: Kidney Research" is the more specific mark out of the two different marks in the portions 325 and 327, and set that more specific mark as part of the banner marking 328.

The enforcement engine 108 may determine that the classification level of the resource 322 matches the maximum permitted classification level 212 as indicated in the panel 201.

The enforcement engine 108 may determine that the dissemination control of the resource 322, "research purposes," matches the maximum permitted dissemination control 242 of "research purposes," and the marking of the resource 302, "Patient Data: Kidney Research," matches one of the allowed markings 262. Thus, the enforcement engine 108 may permit ingestion of the resource 322 into the segment 140. Herein, the allowed markings 262 are construed to also permit less specific markings that entirely encompass the allowed markings 262. For example, if the allowed markings 262 include sub-markings or child markings, which may indicate a subtype of data, such as "Patient Data: Kidney Research," the parent markings which may indicate a corresponding type that is more general than the subtype, such as "Patient Data," may also be permitted. However, in some embodiments, the allowed markings 262 are exclusive and limiting such that no other markings, such as "Patient Data," are permitted. In that scenario, any resource having a marking of "Patient Data" would not be permitted to be ingested into the segment 140.

Figure 4:
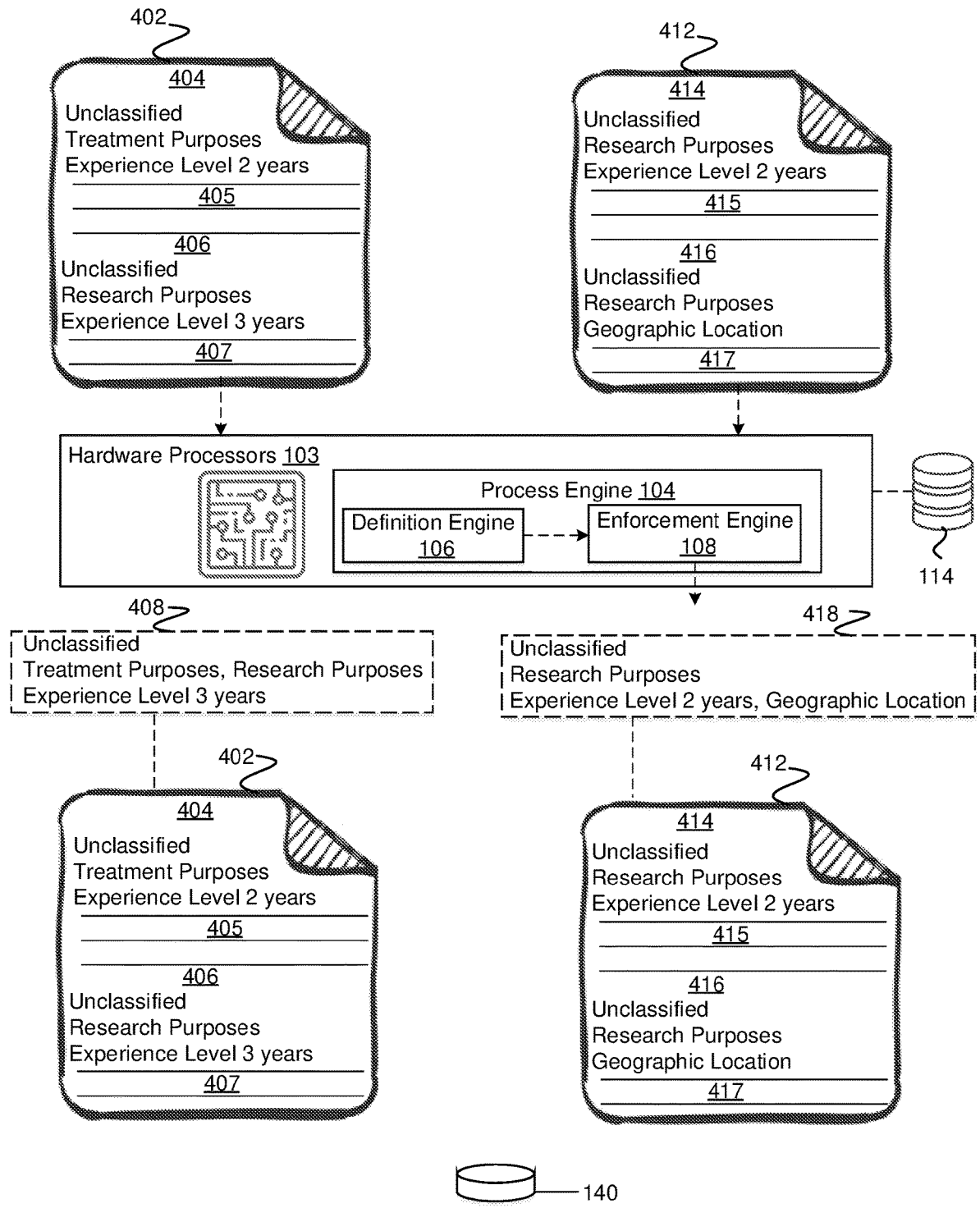
FIG. 4 illustrates an exemplary operation of enforcing or implementing the data security controls and access controls.

FIG. 4 illustrates an implementation of the enforcement engine 108 to enforce or implement constraints and classification levels defined by the definition engine 106 according to the window 201 and the panel 202 of FIG. 2. FIG. 4 illustrates scenarios in which the enforcement engine 108 determines that resources fail to satisfy the constraints and classification levels defined by the definition engine 106. Thus, the enforcement engine 108 would not permit the resources to be ingested into the segment 140. Relevant principles described with respect to FIG. 3 may also apply in the scenarios of FIG. 4. In FIG. 4, the enforcement engine 108 may individually determine whether or not a resource 402, 412 is permitted to be ingested into the segment 140 based on its individual constraints or classifications. In some embodiments, an entity may have requested that the resource 402, 412 be ingested into the segment 140, either from another segment or as a newly created resource.

The resource 402 may include portion markings 404, 406 indicating constraints and classification levels of respective portions 405, 407 of the resource 402. The constraints and classification levels may be in accordance with CBAC. In particular, the portion marking 404 may indicate that the portion 405 is classified at a level of "unclassified." Meanwhile, the portion marking 404 may further indicate that the dissemination of the portion 405 is limited to treatment purposes and the portion 405 is releasable only to entities having an experience level of at least two years. The portion marking 406 may indicate that the portion 407 is classified at a level of "unclassified," that any dissemination of the portion 407 is limited or restricted to research purposes, and that the portion 407 is releasable only to entities having an experience level of at least three years. The enforcement engine 108 may generate a banner marking 408 that provides overall constraints or classifications of the entire resource 402. The banner marking 408 may indicate that the resource 402 is classified at a level of "unclassified," that any dissemination of the resource 402 is limited or restricted to purposes that are categorized under, or satisfy both, treatment and research purposes, and that the resource 402 is only releasable to entities having an experience level of at least three years. Thus, the banner marking 408 captures either the most restrictive control, constraint, or classification level in a scenario of overlapping controls, constraints, or classification levels (e.g., experience level at least two years and at least three years), and cumulatively captures all controls, constraints, or classification levels that are non-overlapping. Here, the dissemination restrictions that the resource be used only for treatment purposes and only for research purposes may be non-overlapping or disjunctive. The enforcement engine 108 may determine that although both the "unclassified" classification and the experience level release restriction indicated in the banner marking 408 both satisfy corresponding constraints defined by the definition engine 106, the dissemination control of requiring purposes that are categorized under, or satisfy both, treatment and research purposes, does not satisfy, and is more restrictive than, a maximum permitted dissemination control of "research purposes" as defined by the definition engine 106. Thus, the enforcement engine 108 may determine that the resource 402 is not permitted to be ingested into the segment 140. However, in other embodiments, the enforcement engine 108 may determine that despite the dissemination control of the resource 402 that requires purposes that are categorized under, or satisfy both, treatment and research purposes, an overall classification level or constraint of the resource 402 may still satisfy the maximum permitted constraints or dissemination controls defined by the definition engine 106. For example, in that scenario, the enforcement engine 108 may have determined that an equivalent classification level that encompasses both "treatment purposes" and "research purposes" is simply one classification level higher. In other words, including both "treatment purposes" and "research purposes" as dissemination controls causes a single level increase in the classification level. Such a determination may be based on logic in the database 114. Thus, a "confidential" classification level with no additional dissemination controls may be equivalent to an "unclassified" classification level with additional dissemination controls that require purposes categorized under, or satisfying both, treatment and research purposes. In that scenario, the enforcement engine 108 would permit the ingestion of the resource 402 into the segment 140.

As another example, the resource 412 may include portion markings 414, 416 indicating constraints and classification levels of respective portions 415, 417 of the resource 412. The constraints and classification levels may be in accordance with CBAC. In particular, the portion marking 414 may indicate that the portion 415 is classified at a level of "unclassified." Meanwhile, the portion marking 414 may further indicate that the dissemination of the portion 415 is limited to research purposes and the portion 415 is releasable only to entities having an experience level of at least two years. The portion marking 416 may indicate that the portion 417 is classified at a level of "unclassified," that any dissemination of the portion 417 is limited or restricted to research purposes, and that the portion 417 is releasable only to entities in a particular geographic location or region. The enforcement engine 108 may generate a banner marking 418 that provides overall constraints or classifications of the entire resource 412. The banner marking 418 may indicate that the resource 412 is classified at a level of "unclassified," that any dissemination of the resource 412 is limited or restricted to purposes that are categorized under, or satisfy, research purposes, and that the resource 412 is only releasable to entities satisfying both conditions of being within a particular geographic location and having at least two years of experience. Thus, the banner marking 418 captures either the most restrictive control, constraint, or classification level in a scenario of overlapping controls, constraints, or classification levels, and cumulatively captures all controls, constraints, or classification levels that are non-overlapping. Here, the release restrictions that an entity is within a particular geographic location and having at least two years of experience may be non-overlapping.

The enforcement engine 108 may determine that although both the "unclassified" classification and the "research purposes" dissemination restriction indicated in the banner marking 418 both satisfy corresponding constraints defined by the definition engine 106, the release restriction that requires an entity be in a particular geographic location does not satisfy the corresponding constraints defined by the definition engine 106. Thus, the enforcement engine 108 may determine that the resource 412 is not permitted to be ingested into the segment 140. However, in other embodiments, the enforcement engine 108 may determine that despite the release control of the resource 412 that requires an entity to satisfy both an experience level and a geographic location restriction, an overall classification level or constraint of the resource 412 may still satisfy the maximum permitted constraints or dissemination controls defined by the definition engine 106. For example, in that scenario, the enforcement engine 108 may have determined that an equivalent classification level that encompasses both geographic location and experience level of an entity is simply one classification level higher. In other words, including both "geographic location" and "experience level" as release controls causes a single level increase in the classification level). Thus, a "confidential" classification level with no additional release controls may be equivalent to an "unclassified" classification level with additional release controls that require an entity to satisfy both an experience level (e.g., at least two years of experience) and a geographic location. In that scenario, the enforcement engine 108 would permit the ingestion of the resource 412 into the segment 140.

Figure 5:
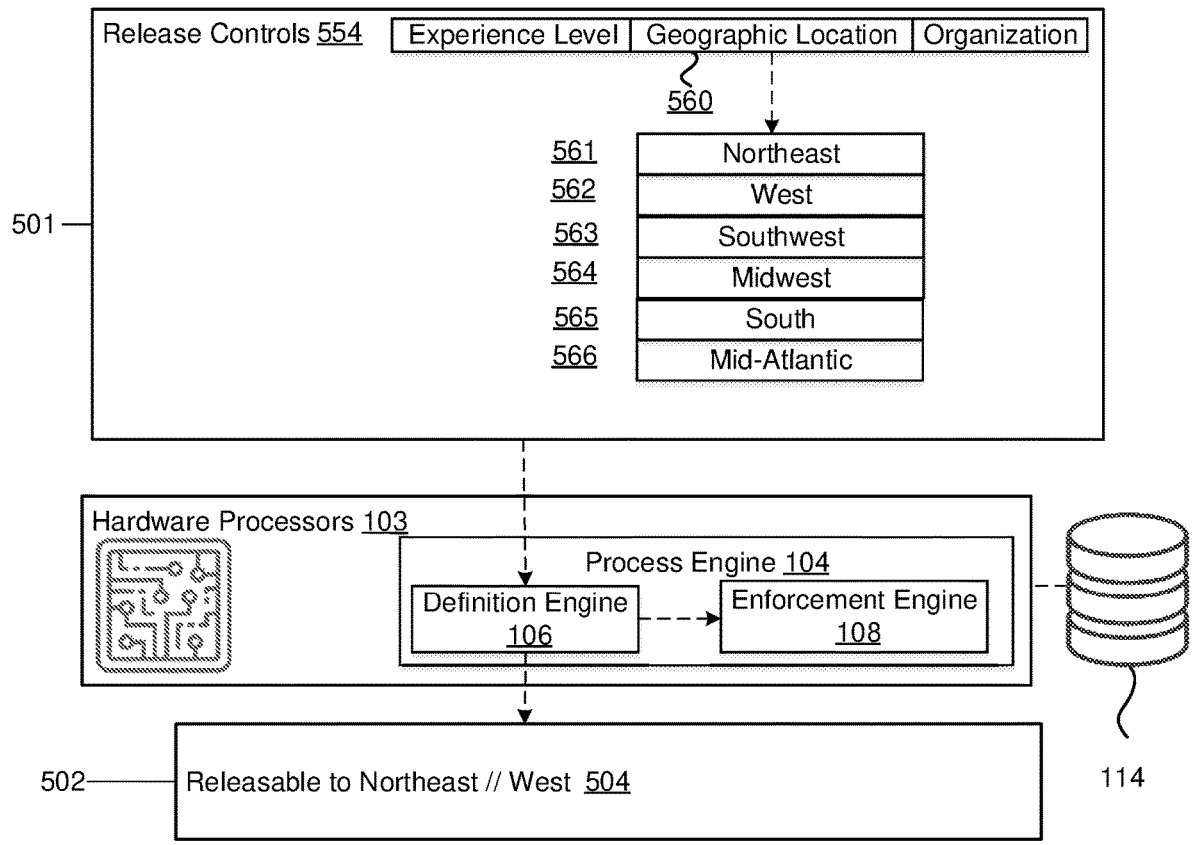
FIG. 5 illustrates an exemplary operation of defining disjunctive constraints, and is an extension of the implementation shown in FIG. 2, in accordance with various embodiments.

FIG. 5 illustrates an implementation of the definition engine 106 to define disjunctive constraints, in addition to the constraints and classification levels defined in FIG. 2. In FIG. 5, a panel 501 may include release controls 554. No other fields are shown in FIG. 5 for simplicity, and to highlight a concept of disjunctive constraints. However, any other aspects of constraints and classification levels not shown in the panel 501 may also be implemented as the panel 201. Thus, other fields corresponding to the classification string 204, the classification level 214, the compartments 234, the dissemination controls 244, and the allowed markings 264, may also be present in the panel 501. The release controls 554 may include criteria of release based on an experience level, a geographic location 560 of an entity, and/or an organization of or associated with an entity. As shown in FIG. 5, options for defining a criteria in the segment 140 based on the geographic location 560 of an entity may include any one or any disjunctive combination of distinct, non-overlapping regions, for example, in the United States. The regions may include the Northeast 561, the West 562, the Southwest 563, the Midwest 564, the South 565, and the Mid-Atlantic 566. Selecting any of the aforementioned regions means that the maximum, or most restrictive, release controls would permit release to entities in any of the selected regions. For example, if the Northeast 561 and the West 562 were selected, then the maximum release controls would permit release of a resource to entities in both the Northeast 561 and the West 562, as indicated in a field 504 of a window 502. A resource being releasable to any enumerated locations (e.g., the Northeast 561 or the West 562) may be construed as that resource being releasable only to those locations or regions, but not releasable to other locations or regions that are not specifically enumerated. If no release controls associated with geographic locations are specified for a resource, then that resource may be releasable to any locations, as long as they are in conformance with other constraints and classification restrictions of that resource. Thus, any resource in the segment 140 cannot have release controls or constraints that exceed, or are more restrictive than, the maximum release controls defined for the segment 140, which is specified in the field as being releasable to both the Northeast 561 and the West 562. For example, if a resource were releasable to the Northeast, that resource would be prohibited from being ingested into the segment 140, because being releasable only to the Northeast is more restrictive than being releasable to both the Northeast and the West.

Figure 6:
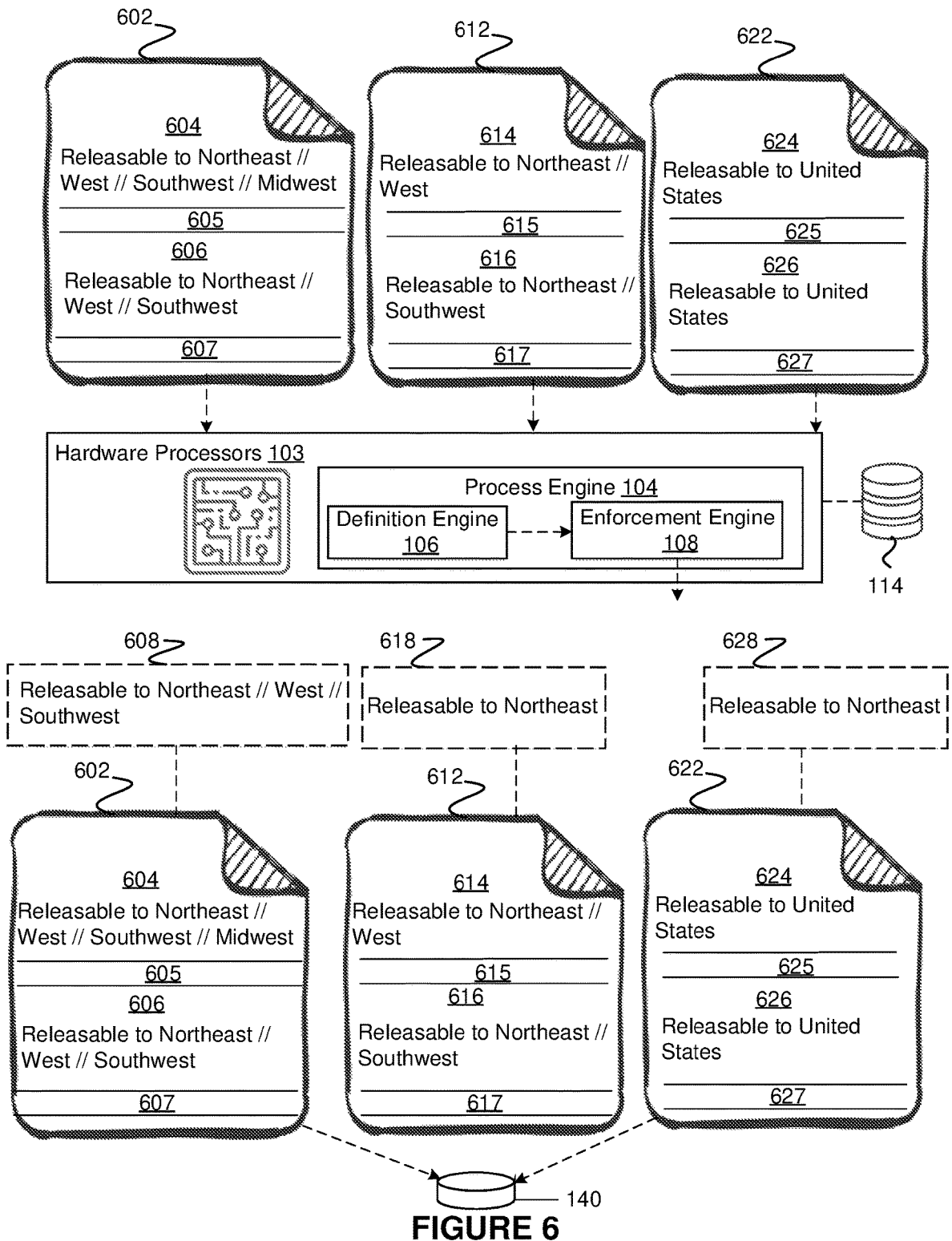
FIG. 6 illustrates an exemplary operation of enforcing or implementing the disjunctive constraints, as defined with reference to FIG. 2 and FIG. 5, in accordance with various embodiments.

FIG. 6 illustrates an implementation of the enforcement engine 108 to enforce disjunctive constraints, according to the constraints defined as shown in the window 502 of FIG. 5. In FIG. 6, the enforcement engine 108 may determine whether or not a resource 602, 612, 622 is permitted to be ingested into the segment 140 based on its individual constraints or classifications. In some embodiments, an entity may have requested that the resource 602, 612, 622 be ingested into the segment 140, either from another segment or as a newly created resource.

The resource 602 may include portion markings 604, 606 indicating release controls or constraints of respective portions 605, 607 of the resource 602. In particular, the portion marking 604 may indicate that the portion 605 is releasable to the Northeast, the West, the Southwest, and the Midwest. The portion marking 606 may indicate that the portion 607 is releasable to the Northeast, the West, and the Southwest. The enforcement engine 108 may generate a banner marking 608 that provides overall release controls or constraints of the entire resource 602 by integrating individual portion markings 604, 606 of each of the portions 605, 607. In some embodiments, the banner marking 608 includes most restrictive release controls or constraints out of all portions of the resource 602, and/or includes release controls or constraints that overlap across all portions of the resource 602. Here, the banner marking 608 indicates that the release controls or constraints of the resource 602 is defined as releasable to the Northeast, the West, and the Southwest. Because only the portion 607 may be releasable to the Midwest and only the portion 607 may be releasable to the Southwest, the entire resource 602 would not be releasable to either the Midwest of the Southwest. Meanwhile, in some embodiments, an individual portion (e.g., 605, 607) may have multiple portion markings indicating release controls or constraints commingled within that portion. In such a scenario, the enforcement engine 108 may determine an overall portion marking using a same or similar principle as that described above for the banner marking 608, but just applied on a scale of a portion rather than an entire resource.

To determine whether the resource 602 is permitted to be ingested into the segment 140, the enforcement engine 108 may compare the banner marking 608 to the maximum level of permitted release controls or constraints indicated in the panel 502 and as defined, for example, via the window 501. Because the release controls or constraints of the resource 602 are less restrictive than the maximum permitted release controls or constraints, which specify that a resource may be releasable to the Northeast and the West, the enforcement engine 108 may permit the ingestion of the resource 602 into the segment 140. The resource 602 is releasable to the Northeast, the West, and the Southwest, meaning that the resource 602 is releasable to all locations specified in the panel 502, along with an additional location of the Southwest. In other words, the resource 602 is not restricted to only being releasable to the Northeast and the West, but is also releasable to the Southwest. In such a manner, the enforcement engine 108 may evaluate disjunctive controls or constraints, such as those specifying particular locations or regions to which a resource may be released, conjunctively (e.g., that each of the individual disjunctive controls or constraints need to be included or satisfied).

The enforcement engine 108 may determine whether or not the resources 612, 622 are permitted to be ingested into the segment 140 using a same or similar manner as described above with respect to the resource 602. The resource 612 may include portion markings 614, 616 indicating release controls or constraints of respective portions 615, 617 of the resource 612. In particular, the portion marking 614 may indicate that the portion 615 is releasable to both the Northeast and to the West. The portion marking 616 may indicate that the portion 617 is releasable to both the Northeast and to the Southwest. The enforcement engine 108 may generate a banner marking 618 that provides overall release controls or constraints of the entire resource 612 by integrating individual portion markings 614, 616 of each of the portions 615, 617. In some embodiments, the banner marking 618 includes most restrictive release controls or constraints out of all portions of the resource 612, and/or includes release controls or constraints that overlap across all portions of the resource 612. Here, the banner marking 618 indicates that the release controls or constraints of the resource 612 is defined as releasable to the Northeast, the only overlapping region between the portions 615 and 617. Because only the portion 615 may be releasable to the West and only the portion 617 may be releasable to the Southwest, the entire resource 612 would not be releasable to either the West or the Southwest.

To determine whether the resource 612 is permitted to be ingested into the segment 140, the enforcement engine 108 may compare the banner marking 618 to the maximum level of permitted release controls or constraints indicated in the panel 502 and as defined, for example, via the window 501. Because the release controls or constraints of the resource 612 are more restrictive than the maximum permitted release controls or constraints, which specify that a resource must be releasable to at least both the Northeast and the West, the enforcement engine 108 may prohibit the ingestion of the resource 612 into the segment 140. The resource 612 may be releasable to only the Northeast, meaning that the resource 612 has release controls or constraints that are more restrictive than the maximum permitted release controls or constraints of the segment 140. In other words, the resource 612 is not permitted to be released to the West because only the portion 615 is releasable to the West, but the portion 617 is not permitted to be released to the West.

Meanwhile, the resource 622 may include portion markings 624, 626 indicating release controls or constraints of respective portions 625, 627 of the resource 622. In particular, the portion markings 624, 626 may indicate that the portions 625, 627 are releasable to the entire United States. The enforcement engine 108 may generate a banner marking 628 that provides overall release controls or constraints of the entire resource 622 by expanding an implied definition or connotation of the entire United States into an equivalent definition or connotation that includes all six enumerated locations or regions enumerated in the window 501. Thus, the entire United States may be expanded to include the Northeast, the West, the Southwest, the Midwest, the South, or the Mid-Atlantic.

To determine whether the resource 622 is permitted to be ingested into the segment 140, the enforcement engine 108 may compare the banner marking 628 to the maximum level of permitted release controls or constraints indicated in the panel 502 and as defined, for example, via the window 501. Because the release controls or constraints of the resource 622 are less restrictive than the maximum permitted release controls or constraints, which specify that a resource needs to be releasable to the Northeast and the West, the enforcement engine 108 may permit the ingestion of the resource 622 into the segment 140. The resource 612 is releasable to any six regions, which is less restrictive than if the resource were only releasable to the Northeast and the West.

Figure 7:
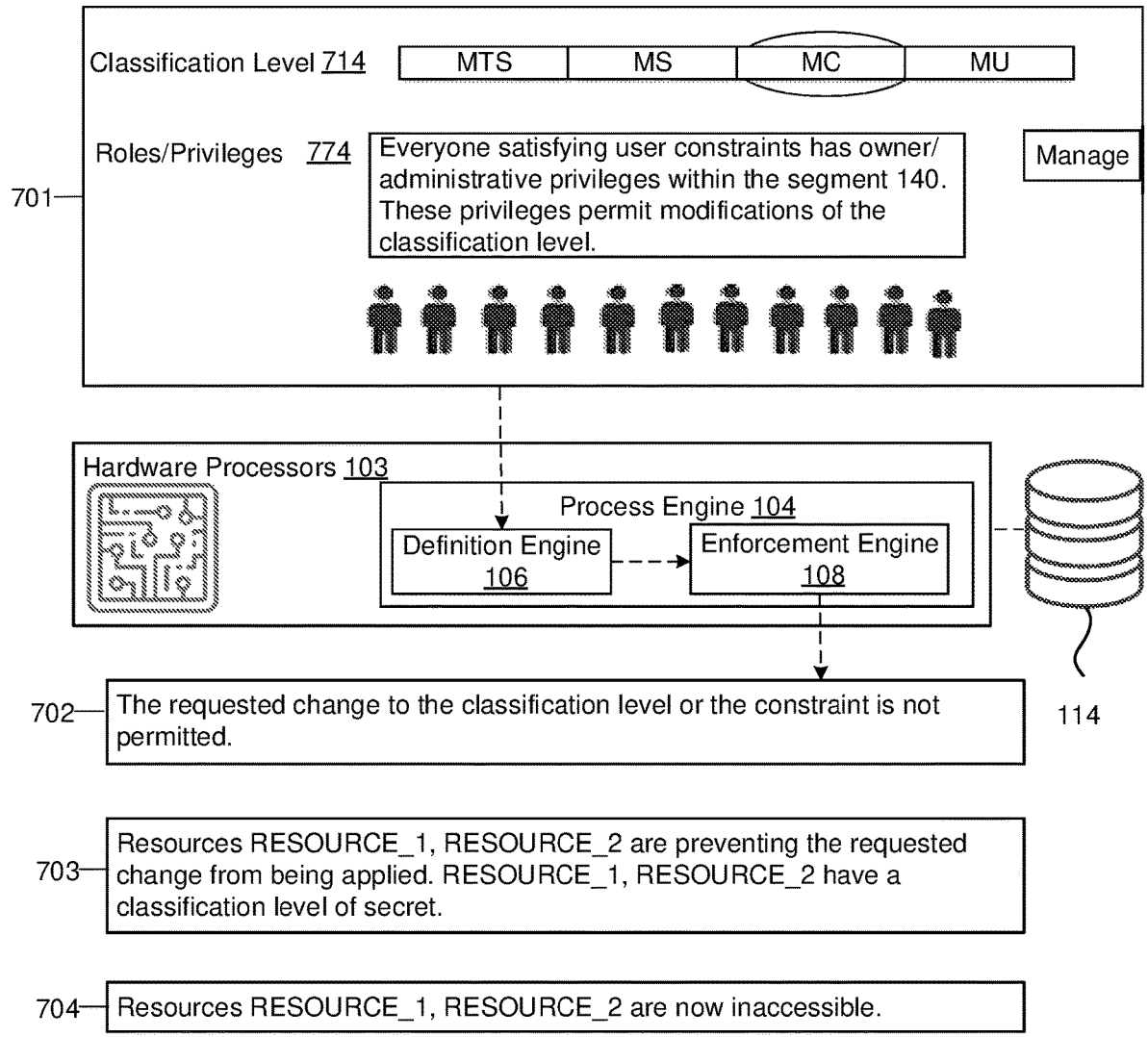
FIG. 7 illustrates an exemplary operation of changing or redefining one or more constraints or classification levels of the segment, in accordance with various embodiments.

FIG. 7 illustrates an exemplary implementation of the definition engine 106 and the enforcement engine 108, in a scenario in which a request to change or redefine one or more constraints or classification levels of the segment 140 is received and validated. In particular, the constraints and classification levels of the segment 140 may already have been defined, for example, in a same or similar manner as described with respect to FIG. 2 and/or FIG. 5. In FIG. 7, a panel 701 includes an option to change a classification level 714, which may indicate a maximum classification level for a resource to be permitted in the segment 140. For example, a user may select one of the enumerated classification levels in order to request a change in the maximum classification level. In this particular scenario illustrated in FIG. 7, a user may have requested a change to the classification level 714 from "secret," as illustrated in FIG. 2 and FIG. 5, to "confidential." In some embodiments, the definition engine 106 may prevent a request to change a classification level or a constraint of the segment 140 if such a change would violate, or cause noncompliance with, a classification level or a constraint of a particular resource within the segment 140. For example, if a resource in the segment 140 had a classification level of "secret," then a change to the classification 714 from "secret" to "confidential" would not be permitted. Buttons or selections corresponding to these unpermitted changes may be greyed out or invisible. In other embodiments, the definition engine 106 may still permit any request to change a classification level or a constraint of the segment 140, but that request would be validated by the enforcement engine 108, as will be described below. Although only a change to the classification level 714 is described, any other fields, such as the compartments 234, the dissemination controls 244, the release controls 254, or the allowed markings 264, as illustrated in the panel 201 or the panel 501, may be changed in a similar or same manner as described herein in FIG. 7.

Additionally, the panel 701 may include rules or privileges 774, which define entities, or users, that have administrative and/or ownership privileges within the segment 140, as well as the exact privileges encompassed by the administrative and/or ownership privileges. For example, users that have administrative and/or ownership privileges may have the ability to change or redefine certain or all constraints and classification levels within the segment 104. In particular, users that have administrative and/or ownership privileges may be able to change the maximum classification level in certain manners. The rules or privileges 774 may be modified or managed. Other features of the panel 701, although not shown for purposes of simplicity, may be implemented as the panel 201 and/or the panel 501.

Once the definition engine 106 receives a request to change the classification level to "confidential," the enforcement engine 108 may analyze and validate the request to determine whether such a request is permitted, based on constraints and/or classification levels of resources within the segment 140. For example, the enforcement engine 108 may determine that such a change conflicts with classification levels of some resources that are at classification levels of "secret." Depending on a specific implementation, the enforcement engine 108 may reject or block the requested change, or alternatively, permit the requested change while making other modifications, for example, to resources that would violate or fail to satisfy the constraints and classification levels resulting from the requested change. The enforcement engine 108 may then display any or all of windows 702, 703, 704. The windows 702, 703, 704 may be manifested as interfaces, such as tooltips, pop-out menus, popup windows, or hover boxes. The window 702 may indicate that such a requested change is not permitted. The window 703 may more specifically indicate particular resources that would exceed or violate the requested classification level and/or a reason that those particular resources would exceed or violate the requested classification level. The window 704 may indicate that the requested change in classification level to "confidential" is permitted but render resources that violate or fail to satisfy the new classification level (e.g., that exceed the new maximum classification level defined in the segment 140 of "confidential"). In some embodiments, the enforcement engine 108 may prevent access (e.g., viewing contents and/or modifications) to resources that violate or fail to satisfy the new classification level, but may still keep those resources in a visible state. For example, a user accessing the segment 140 following the changed constraints and classification levels would be able to see that those resources exist but not view contents of those resources. In some embodiments, the enforcement engine 108 may render invisible the resources that violate or fail to satisfy the new classification level, such that even an existence of those resources is no longer visible.

Figure 8:
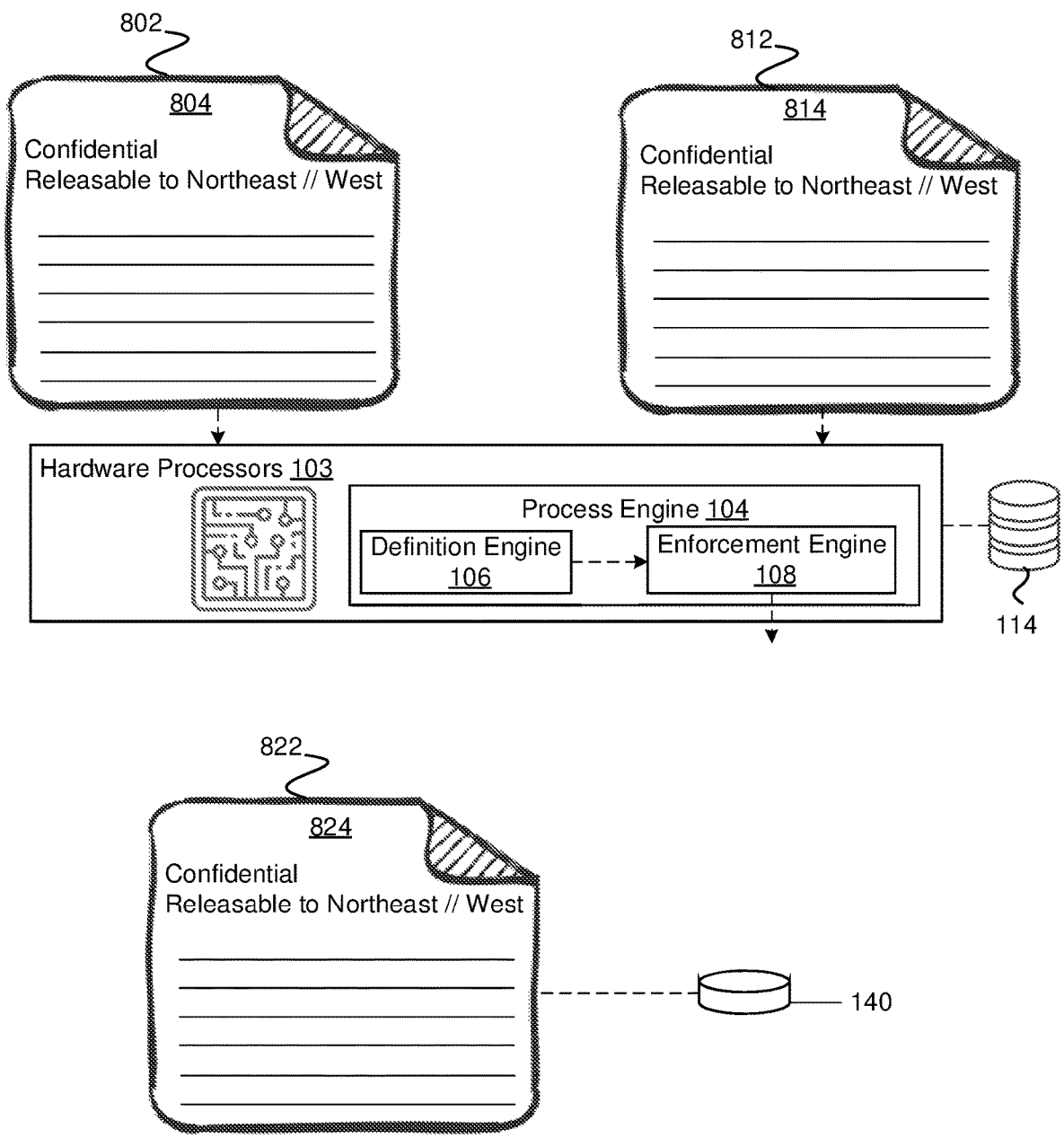
FIG. 8 illustrates an exemplary operation of handling classification by aggregation or classification by compilation, in accordance with various embodiments.

FIG. 8 illustrates an exemplary embodiment that illustrates a concept of classification by aggregation or classification by compilation, in which two or more resources, when integrated (e.g., aggregated, compiled, joined, or merged), have a higher classification level compared to when each of the resources exist individually. This higher classification level may stem from an additional association being revealed or inferred as a result of the resources being integrated. For example, this additional association may be between two entities, one of which is described in a first resource and another of which is described in a second resource, when the first resource and the second resource are integrated. Additionally, when two or more resources are integrated, other constraints such as dissemination controls or release controls may be different compared to when each of the resources exist individually.

In FIG. 8, resources 802, 812, and 822 may have respective banner markings 804, 814, and 824 indicating a "confidential" classification level, and that they are releasable to the Northeast and West. In the scenario of FIG. 8, the resource 822 is already be in the segment 140. The resources 802 and 812 have been requested to be ingested into the segment 140 while being integrated with each other and/or with the resource 822, and the enforcement engine 108 determines whether such action is permitted. Assume that constraints and classification levels for ingestion into the segment 140 here are enforced according to the panel 502 of FIG. 5 and the panel 202 of FIG. 2. Individually, each of the resources 802, 812 may satisfy the maximum permitted constraints or controls as indicated in the panel 502 of FIG. 5 and the panel 202 of FIG. 2. However, when the resources 802, 812 are combined with each other, and/or with the resource 822, the resulting classification level, and/or other constraints may change. Thus, upon receiving or processing a request to integrate any of the resources 802, 812, 822, the enforcement engine 108 may determine whether classification by compilation or aggregation is applicable, and if so, how a resulting classification level or other constraints of an integrated resource would be different from the classification level and constraints of each of the individual resources 802, 812, 822. In some embodiments, the enforcement engine 108 may transmit a query to a user regarding whether a resulting classification level or other constraints from integrating resources 802, 812, and/or 822 would change, and if so, what they would change to. In some embodiments, the enforcement engine 108 may extract keywords and/or markings from each of the resources 802, 812, and/or 822 requested to be integrated. The enforcement engine 108 may infer whether any additional associations of entities would arise based on the extracted keywords and/or markings. In some examples, the enforcement engine 108 may, additionally or alternatively, transmit a query to a user regarding whether additional associations of entities would arise, and how these additional associations would affect a classification level or other constraints resulting from an integrated resource. For example, if the enforcement engine 108 determines that integrating the resources 802, 812, and 822 would result in a classification level being raised to "secret" or "top secret", then a resulting integrated resource would be prohibited from being ingested into the segment 140.

In some embodiments, the definition engine 106 may set additional constraints to account for classification by compilation or aggregation. In particular, the definition engine 106 may permit otherwise qualifying resources, which individually satisfy the maximum constraints and classification levels of the segment 140, but may establish rules to restrict a subset (e.g., some or all) of the otherwise qualifying resources from being integrated with one another and/or with another resource already in the segment 140, based on whether such an integration would result in a higher classification level or constraint, and/or whether that higher classification level or constraint still satisfies the maximum constraints and classification levels of the segment 140. The enforcement engine 108 may then enforce such rules.

Figure 9:
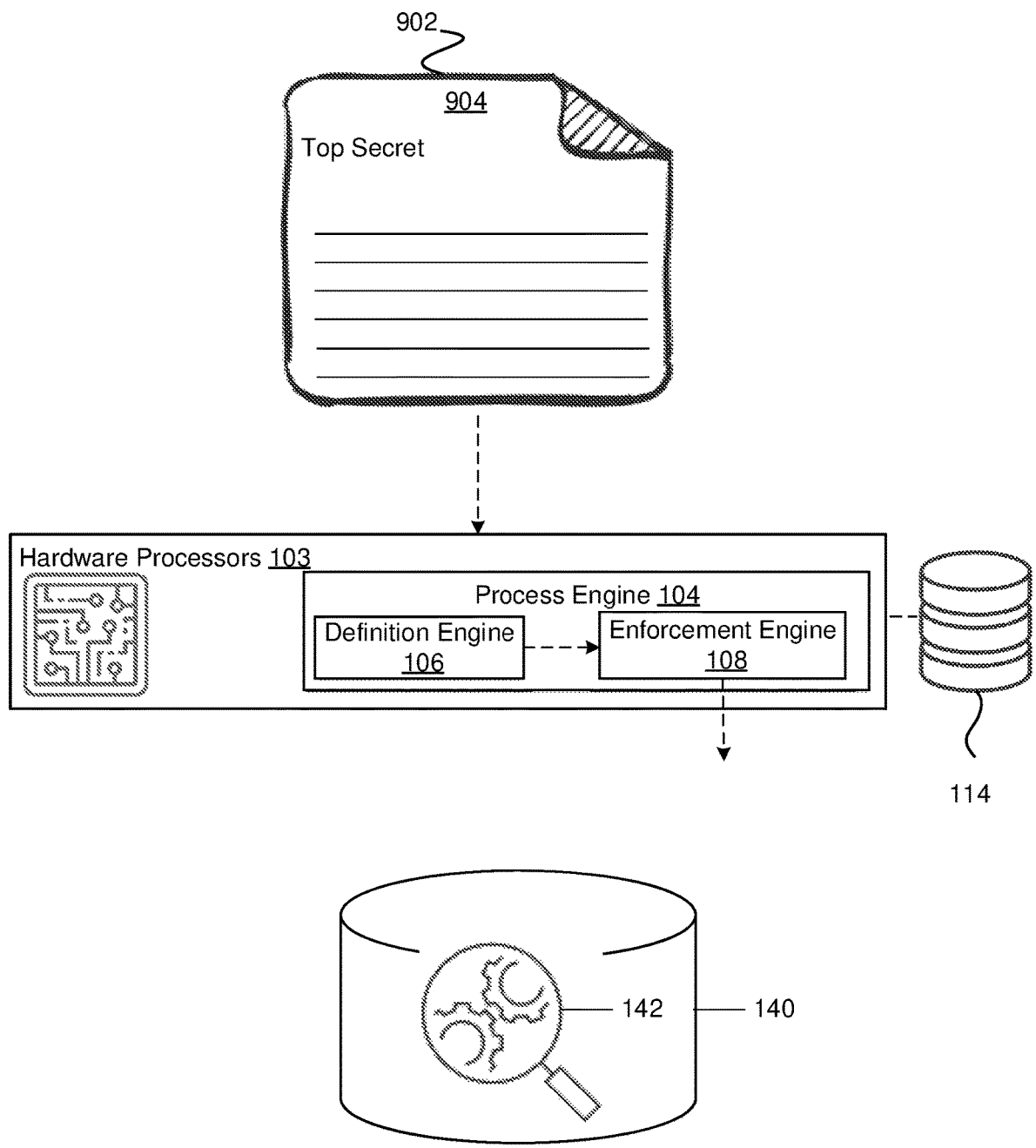
FIG. 9 illustrates an exemplary operation of enforcing data security controls and access controls within a resource or platform that is inserted or embedded into the segment, in accordance with various embodiments.

FIG. 9 illustrates an implementation in which a resource, tool or platform 142 (hereinafter "platform"), such as an analysis resource, tool or platform, is ingested into, exists within, or is embedded within the segment 140. Assume that in the segment 140 of FIG. 9, the constraints and classification levels may be defined as they were in any or all of applicable previous FIGURES, such as in the panel 202 of FIG. 2 and/or the panel 502 of FIG. 5 (e.g., the maximum classification level of the segment 140 is "secret"). Therefore, the enforcement engine 108 would prohibit, from ingestion into the segment 140, a resource 902 having a banner marking 904 that indicates a "top secret" classification level because the "top secret" classification level of the resource 902 exceeds a maximum permitted classification level of "secret" in the segment 140. Meanwhile, the platform 142 may either be unmarked or itself have constraints and a classification level that satisfies the constraints and classification levels defined for the segment 140. For example, the platform 142 may be unmarked, or have a "confidential" or "secret" classification level. In addition, import or ingestion of an other resource into the platform 142 would also need to be regulated or enforced. In some embodiments, the constraints and classification levels defined to regulate data import into the segment 140 would need to be carried over to, or inherited by, the platform 142, which is distinct from the classification level and constraints of the platform 142 itself. In such a manner, the platform 142 itself and/or the enforcement engine 108 would prohibit ingestion or import of an other embedded or nested resource, such as the resource 902, that fails to satisfy the constraints and classification levels defined for the segment 140. Such a scenario may exist, for example, if the platform 142 is a data analysis platform within the segment 140 and the resource 902 is a dataset on which data analysis is to be performed. Therefore, ingestion or importation of the resource 902 directly into the platform 142 would also be enforced or regulated based on the constraints and classification levels defined for the segment 140, at least some of which may be based on CBAC.

In some embodiments, import or ingestion of the resource 902 into the platform 142, along with other resources that violate the constraints and classification levels defined for the segment 140, may be avoided by requiring that any resource being ingested into the platform 142 or into the segment 140 be marked in accordance with CBAC and/or custom markings. In some embodiments, the enforcement engine 108 may require that any resource, or a subset of resources, compatible with or specifically equipped for the platform 142 be marked in accordance with CBAC and/or custom markings. In some embodiments, if the resource 902 were accidentally or mistakenly imported into the platform 142, a title or other identifier of the resource 902 may be visible to a user accessing the platform 142, even if that user has a lower classification level compared to that of the resource 902. However, if the title is changed by another user who actually requested the import of the resource 902 into the platform 142, then the title would be invisible to a user having a lower classification level compared to that of the resource 902.

Figure 10:
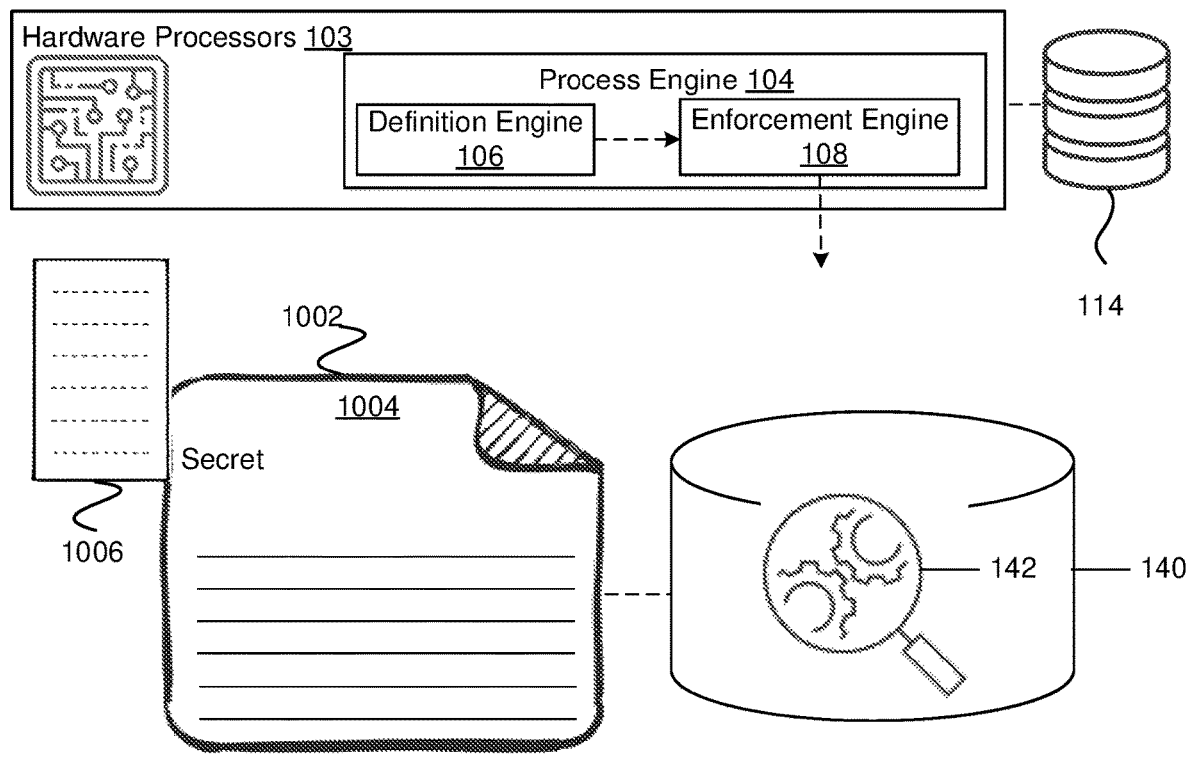
FIG. 10 illustrates an exemplary operation of enforcing data security controls and access controls of, and within, an issue, annotation, or log associated with a resource inside the segment, in accordance with various embodiments.

FIG. 10 illustrates an implementation in which an issue, annotation, or log is created on, or corresponding to, a resource within the segment 140, or within the platform 142. Assume that in the segment 140, the constraints and classification levels may be defined as they were in any or all of applicable previous FIGURES, such as in the panel 202 of FIG. 2 and/or the panel 502 of FIG. 5 (e.g., the maximum classification level of the segment 140 is "secret"). A resource 1002 having a banner marking 1004 indicating a classification level of "secret" may be permitted to be ingested into the segment 140. The resource 1002 may either inherit the "secret" classification level from an upstream resource or have the "secret" classification level originated with the resource 1002 itself (e.g., not inherited from any other resource). Meanwhile, the enforcement engine 108 may determine whether an issue, annotation, or log 1006 that is created on the resource 1002 satisfies the constraints and classification levels defined for the segment 140. If the issue, annotation, or log 1006 fails to satisfy the constraints and classification levels defined for the segment 140, then the enforcement engine 108 would prohibit the issue, annotation, or log 1006 from being created or appearing in the segment 140. A classification level, dissemination controls, and/or release controls of the issue, annotation, or log 1006 may be set by a user upon a prompt, in some embodiments. If no classification level, dissemination controls, and/or release controls of the issue, annotation, or log 1006 has been set, the issue, annotation, or log 1006 may inherit a classification level, dissemination controls, and/or release controls from its corresponding parent resource, along with permissions. In some embodiments, a classification level, dissemination controls, and/or release controls of an issue may also be edited. In some examples, an issue may include a request for data.

In addition, import or ingestion of an other resource into the issue, annotation, or log 1006 would also need to be regulated or enforced. In some embodiments, the constraints and classification levels defined to regulate data import into the segment 140 would need to be carried over to, or inherited by, the issue, annotation, or log 1006, which is distinct from the classification level and constraints of the issue, annotation, or log 1006 itself. In such a manner, the issue, annotation, or log 1006 itself and/or the enforcement engine 108 would prohibit ingestion or import of an other embedded or nested resource, such as the resource 902, that fails to satisfy the constraints and classification levels defined for the segment 140. Such a scenario may exist, for example, if the issue, annotation, or log 1006 itself contained a resource (e.g., dataset). Therefore, ingestion or importation of resources directly into the issue, annotation, or log 1006 would also be enforced or regulated based on the constraints and classification levels defined for the segment 140, at least some of which may be based on CBAC.

Figure 11:
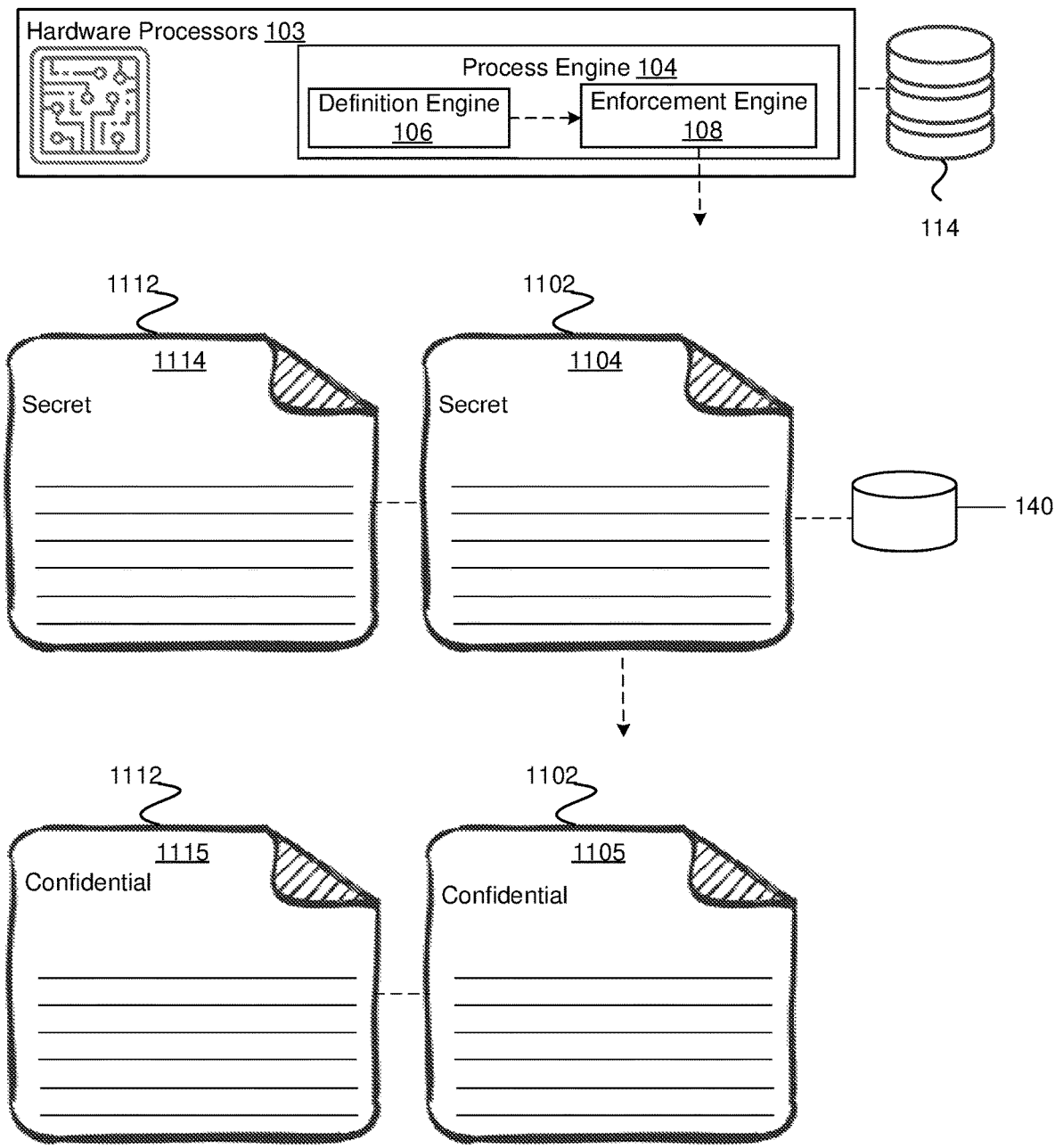
FIG. 11 illustrates an exemplary operation of evaluating and validating proposed or potential modifications to constraints or a classification level of an upstream resource.
Figure 12:
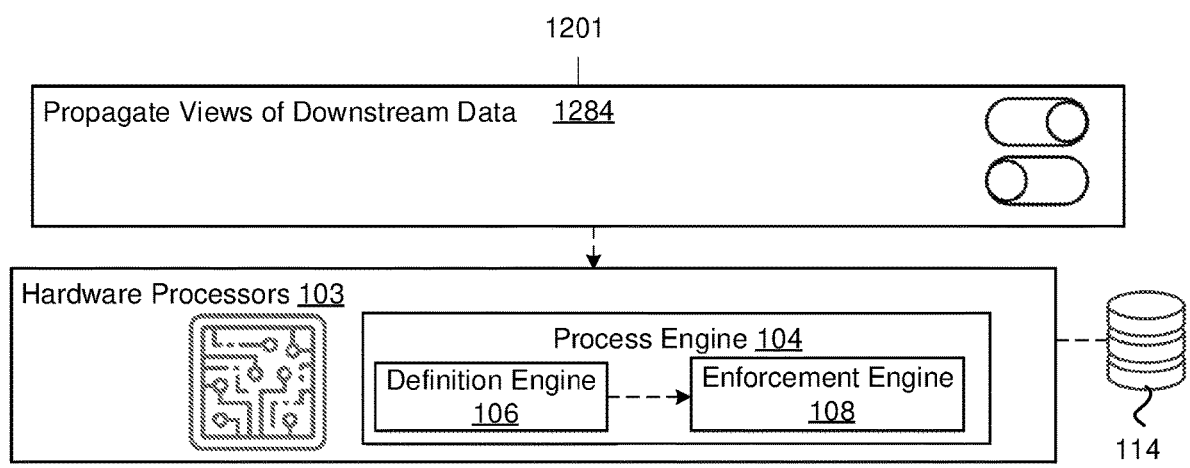
FIG. 12 illustrates an exemplary window that defines how downstream resources within the segment may be viewed, in accordance with various embodiments.

FIG. 11 illustrates an implementation in which proposed or potential modifications to constraints or a classification level of an upstream resource are evaluated and validated based on constraints and classification levels defined for the segment 140. Assume that in the segment 140, the constraints and classification levels may be defined as they were in any or all of applicable previous FIGURES, such as in the panel 202 of FIG. 2 and/or the panel 502 of FIG. 5 (e.g., the maximum classification level of the segment 140 is "secret"). In some embodiments, a window, such as a window 1201 of FIG. 12, may further include an option 1284 to view any downstream resources within the segment 140 that were derived from an upstream resource also within the segment 140. In some embodiments, such an option may be selected using, for example, a toggle bar or a selection bar. The ability to view any downstream resources may be predicated or based upon a privilege to view resources within the segment 140. Referring back to the example of FIG. 11, the segment 140 may contain an upstream resource 1102 having a banner marking 1104 indicating a classification level of "secret," and a downstream resource 1112 that inherits the classification level of "secret" from the upstream resource 1102, as shown in a banner marking 1114. A classification level of the upstream resource 1102 may be changed to be higher or lower, as long as the changed classification level satisfies the constraints and classification levels defined for the segment 140. The downstream resource 1112 may inherit any change in the classification level of the upstream resource 1102. The upstream resource 1102 may not be permitted to be reclassified to a classification level of "top secret" because such action would violate the maximum classification level of the segment 140. However, as shown in FIG. 11, the upstream resource 1102 may be reclassified to a classification level of "confidential," as shown in the banner marking 1105, and the downstream resource 1112 would inherit the classification level of "confidential, as shown in a banner marking 1115.

Figure 13:
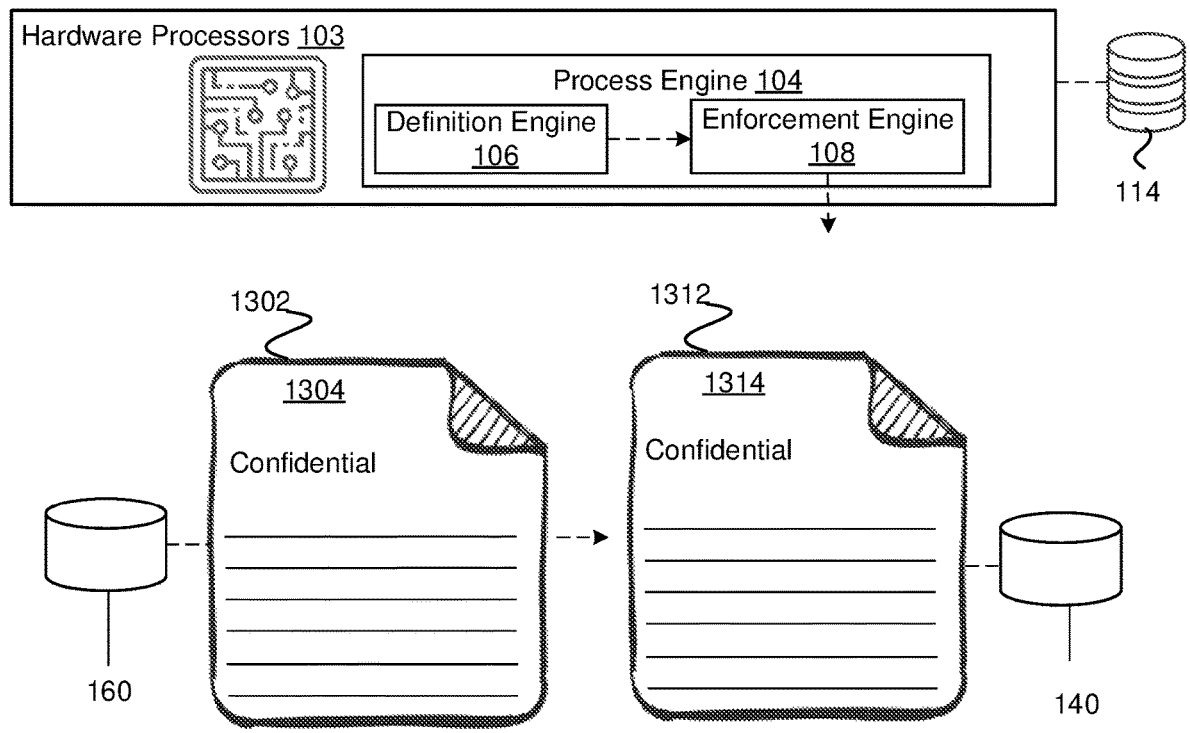
FIG. 13 illustrates an exemplary operation of evaluating and validating proposed or potential modifications to constraints or a classification level of an upstream resource.

FIG. 13 illustrates an implementation in which proposed or potential modifications to constraints or a classification level of an upstream resource are evaluated and validated. Assume that in the segment 140, the constraints and classification levels may be defined as they were in any or all of applicable previous FIGURES, such as in the panel 202 of FIG. 2 and/or the panel 502 of FIG. 5 (e.g., the maximum classification level of the segment 140 is "secret"). In FIG. 13, an upstream resource 1302 may be stored in a different segment (e.g., a second segment 160) than the segment 140. The upstream resource 1302 may include a banner marking 1304 that indicates a classification level of "confidential." A downstream resource 1312 may be stored in the segment 140 and inherit the "confidential" classification level of the upstream resource 1312, as indicated in a banner marking 1314. In some embodiments, any change in a classification level of the upstream resource 1302 is required or constrained to be compatible with or consistent with the classification level of the downstream resource 1312, and with the constraints and classification level defined for the segment 140 (e.g., a segment that stores the downstream resource 1312). For example, a reclassification of the upstream resource 1302 to a level of "secret" may violate such a constraint because "secret" would not match a classification level of the downstream resource 1312, "confidential," even though "secret" would satisfy the constraints and classification level defined for the segment 140. Such a reattempted classification may fail to synchronize with the downstream resource 1312. In such a scenario, the downstream resource 1312 may still exist within the segment 140 without being deleted. A user that has a classification level of at least "secret" (which, assuming mirrored user constraints, would hold true for every user accessing the segment 140) may still have at least partial access to the downstream resource 1312, but certain aspects of the downstream resource 1312 may not be fully enabled. For example, specific portions of the downstream resource 1312 that correspond to portions of the upstream resource 1302 that caused or resulted in the classification level change to "secret" may not be fully visible or enabled. Additionally, a user of the downstream resource 1312 that has a classification level of "secret" may be able to access a reason that the downstream resource 1312 failed to synchronize. A user of the downstream resource 1312 that has a classification level lower than "secret" may be unable to access such a reason.

Similarly, a reclassification of the upstream resource 1302 to a level of "top secret," may be incompatible with the downstream resource 1312 because "top secret" would not match a classification level of the downstream resource 1312, "confidential." Additionally, "top secret" would fail to satisfy the constraints and classification level defined for the segment 140. In such a scenario, the downstream resource 1312 may still exist within the segment 140 without being deleted. A user that has a classification level of at least "top secret" may still have at least partial access to the downstream resource 1312, but certain aspects of the downstream resource 1312 may not be fully enabled. For example, specific portions of the downstream resource 1312 that correspond to portions of the upstream resource 1302 that caused or resulted in the classification level change to "top secret" may not be visible or enabled. Additionally, a user that has a classification level of "secret" may lose access to, or be unable to access, a portion or an entirely of the downstream resource 1312. Moreover, only a user of the downstream resource 1312 that has a classification level of "top secret" may be able to access a reason that the downstream resource 1312 failed to synchronize. A user of the downstream resource 1312 that has a lower classification level than "top secret" would be unable to access such a reason. Similarly, assume for the sake of example that the maximum classification level of the segment 140 is "top secret", and the upstream resource 1302 originally has a classification level of "secret," which is inherited by the downstream resource 1312. A change in a classification level of the upstream resource 1302 to "top secret" would be incompatible with the downstream resource 1312 because "top secret" would be incompatible with the "secret" classification level of the downstream resource 1312, although "top secret" complies with the maximum classification level of the segment 140. In such a scenario, only a user of the downstream resource 1312 that has a classification level of "top secret" may be able to access a reason that the downstream resource 1312 failed to synchronize. A user of the downstream resource 1312 that has a lower classification level than "top secret" would be unable to access such a reason.

Figure 14:
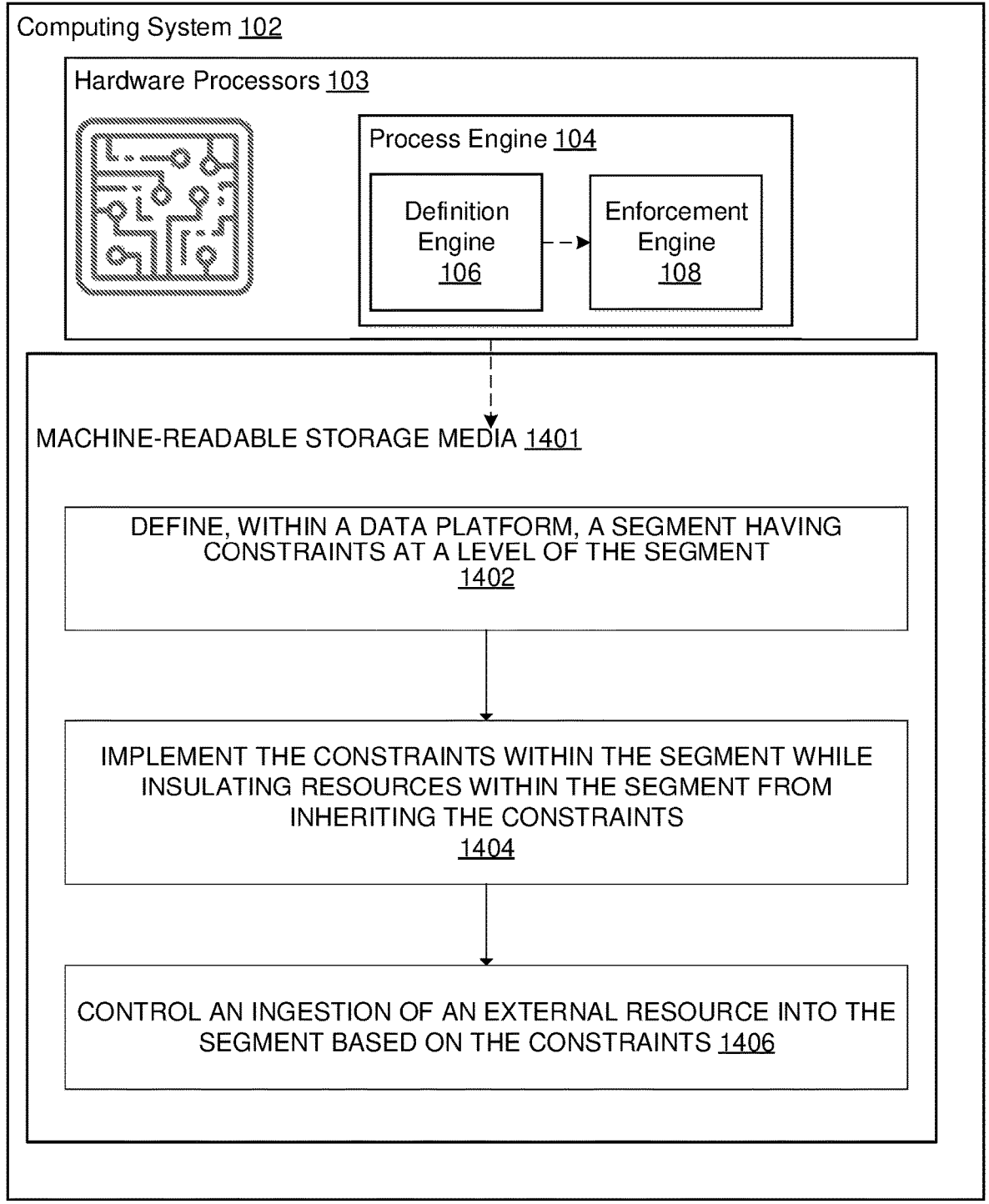
FIG. 14 illustrates a flowchart of an example method involving data security controls and access controls, in accordance with various embodiments of the present technology.

FIG. 14 illustrates an exemplary flowchart, according to various embodiments of the present disclosure. A method described in the flowchart may be implemented in various environments including, for example, the environment 100 of FIG. 1. The operations of method 1400 presented below are intended to be illustrative. Depending on the implementation, the example method 1400 may include additional, fewer, or alternative steps performed in various orders or in parallel. The example method 1400 may be implemented in various computing systems or devices including one or more processors, in particular, the hardware processor(s) 103, using a set of machine-readable/machine-executable instructions within machine-readable storage media 1401 that, when executed, cause the hardware processor(s) 103 to define and/or implement data security features within a particular segment of a data platform. In step 1402, the hardware processor(s) 103 may execute machine-readable/machine-executable instructions stored in the machine-readable storage media 1401 to define, within a data platform, a segment having constraints at a level of the segment. In some embodiments, the constraints may include, without limit, various categories of controls such as general classification levels (e.g., "top secret," "secret," "confidential," or "unclassified"), dissemination controls, release controls, and particular markings that are permitted, required, or prohibited. Examples of constraints were described with reference to FIG. 2 and FIG. 5, and particular configurations of constraints were shown in the panel 202 of FIG. 2 and the panel 502 of FIG. 5. In step 1404, the hardware processor(s) 103 may execute machine-readable/machine-executable instructions stored in the machine-readable storage media 1401 to implement the constraints within the segment while insulating resources within the segment from inheriting the constraints. For example, if the constraints indicate a maximum permitted classification level that a resource could have in order to satisfy the constraints of the segment 140, some resources within the segment 140 may be classified at a lower level compared to the maximum permitted classification level. Additionally, downstream resources, either within the segment 140 or outside of the segment 140, would be insulated or prevented from inheriting the maximum permitted classification level. In step 1406, the hardware processor(s) 103 may execute machine-readable/machine-executable instructions stored in the machine-readable storage media 1401 to control an ingestion of an external resource into the segment based on the constraints. For example, the controlling may be based on a comparison between markings of the external resource and the constraints. In a particular scenario, if the external resource is unmarked (e.g., lacking any markings), the external resource is deemed to satisfy the constraints and permitted to be ingested into the segment.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 15:
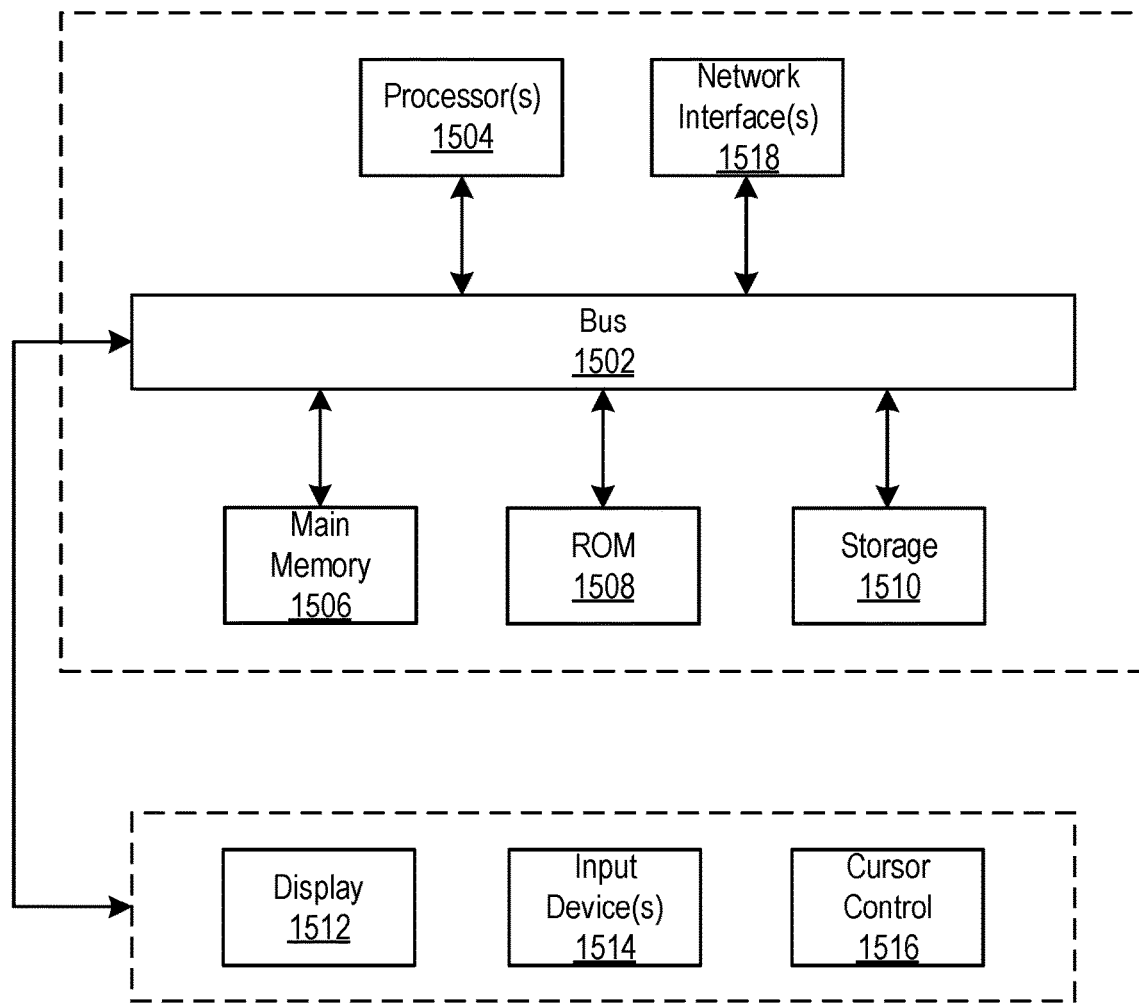
FIG. 15 illustrates a block diagram of an example computer system in which any of the embodiments described herein may be implemented.

FIG. 15 is a block diagram that illustrates a computer system 1501500 upon which any of the embodiments described herein may be implemented. The computer system 1500 includes a bus 1502 or other communication mechanism for communicating information, one or more hardware processors 1504 coupled with bus 1502 for processing information. Hardware processor(s) 1504 may be, for example, one or more general purpose microprocessors.

The computer system 1500 also includes a main memory 1506, such as a random access memory (RAM), cache and/or other dynamic storage devices, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

The computer system 1500 further includes a read only memory (ROM) 1508 or other static storage device coupled to bus 1502 for storing static information and instructions for processor 1504. A storage device 1510, such as a magnetic disk, optical disk, or USB thumb drive (Flash drive), etc., is provided and coupled to bus 1502 for storing information and instructions.

The computer system 1500 may be coupled via bus 1502 to a display 1512, such as a cathode ray tube (CRT) or LCD display (or touch screen), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor(s) 1504 executing one or more sequences of one or more instructions contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1510. Volatile media includes dynamic memory, such as main memory 1506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may retrieves and executes the instructions. The instructions received by main memory 1506 may optionally be stored on storage device 1510 either before or after execution by processor 1504.

The computer system 1500 also includes a communication interface 1518 coupled to bus 1502. Communication interface 1518 provides a two-way data communication coupling to one or more network links that are connected to one or more local networks. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN (or WAN component to communicated with a WAN). Wireless links may also be implemented. In any such implementation, communication interface 1518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1518, which carry the digital data to and from computer system 1500, are example forms of transmission media.

The computer system 1500 can send messages and receive data, including program code, through the network (s), network link and communication interface 1518. In the Internet example, a server might transmit a requested code for an application program through the Internet, the ISP, the local network and the communication interface 1518.

The received code may be executed by processor 1504 as it is received, and/or stored in storage device 1510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computing system that implements security controls within a data platform, comprising:
one or more processors; and
memory storing instructions that, when executed by the one or more processors, cause the system to perform:
partitioning, within the data platform, segments, each segment having a different set of constraints, wherein the constraints comprise a maximum classification or one or more permitted classifications, wherein the maximum classification is selected from discrete hierarchical classification levels corresponding to different categories, the maximum classification defining a highest acceptable level corresponding to each of the categories in order for an external resource to conform with or satisfy the constraints, and the permitted classifications comprising non-hierarchical classifications;
implementing a set of constraints within a segment while insulating resources within the segment from inheriting the set of constraints; and
controlling, via a wired or wireless communication network, an ingestion of a first external resource into the segment based on the set of constraints, wherein the controlling the ingestion of the first external resource comprises:
determining, for each of the categories in the segment, whether a corresponding classification level of the first external resource, as indicated by one or more markings of the first external resource, satisfies the set of constraints for each of the categories; and
in response to determining that the corresponding classification level of the first external resource fails to satisfy the set of constraints for one of the categories, selectively permitting, via the wired or wireless communication network, the ingestion of the first external resource into the segment while issuing a flag indicating a category of which the corresponding classification level of the first external resource failed to satisfy the set of constraints;

generating an issue or log associated with the first external resource;

ingesting, via the wired or wireless communication network, the issue or log into the segment; and propagating the set of constraints in the segment associated with the first external resource to the issue or the log;

in response to determining that the first external resource or that a second external resource has a classification level that fails to satisfy the set of constraints, determining or predicting whether the first external resource or the second external resource will have a future classification level that satisfies the set of constraints;

in response to the determining or predicting that the first external resource or the second external resource will have a future classification level that satisfies the set of constraints, ingesting the second external resource into the segment and at least temporarily restricting access to the first external resource or the second external resource.

2. The computing system of claim 1, wherein the maximum classification indicates that, if the corresponding classification level of the first external resource exceeds the maximum classification, then the first external resource fails to satisfy the set of constraints.

3. The computing system of claim 2, wherein the implementing of the set of constraints includes:

defining a mirrored user constraint based on the maximum classification, the mirrored user constraint requiring a user attempting to access the segment to have at least a clearance level corresponding to the maximum classification.

4. The computing system of claim 3, wherein, even if the first external resource or a different resource within the segment has a classification level at or below a corresponding clearance level of the user, the mirrored user constraint prohibits the user from accessing the first external resource or the different resource.

5. The computing system of claim 1, wherein the set of constraints comprise the maximum classification that includes the categories.

6. The computing system of claim 5, wherein the categories include a general classification level, a dissemination control, and a release control, and the controlling an ingestion of the first external resource into the segment includes:

determining whether a corresponding general classification level of the first external resource satisfies the general classification level indicated by the set of constraints;

determining whether a corresponding dissemination control of the first external resource satisfies the dissemination control indicated by the set of constraints;

determining whether a corresponding release control of the first external resource satisfies the release control indicated by the set of constraints; and in response to determining that the corresponding general classification level, the corresponding dissemination control, and the corresponding release control of the first external resource satisfies the general classification level, the dissemination control, and the release control indicated by the set of constraints, permitting the ingestion of the first external resource into the segment.

7. The computing system of claim 5, wherein the controlling an ingestion of the first external resource into the segment includes:

determining, for each of the categories, whether the corresponding classification level of the first external resource, as indicated by one or more markings of the first external resource, satisfies the highest acceptable level indicated by the set of constraints; and in response to the determining that the corresponding classification level of the first external resource satisfies the highest acceptable level indicated by the set of constraints for each of the categories, permitting the ingestion of the first external resource into the segment.

8. The computing system of claim 1, wherein the set of constraints include a conjunctive classification rule and a disjunctive classification rule; and implementation of the set of constraints comprises:

expanding the conjunctive classification rule to include implied hierarchical relationships among different levels associated with the conjunctive classification rule; and enforcing the disjunctive classification rule conjunctively such that, a particular resource that includes only some but not all disjunctive features indicated in the disjunctive classification rule is deemed to fail to satisfy the set of constraints.

9. The computing system of claim 1, wherein implementation of the set of constraints within the segment includes determining whether to propagate a change in a classification level of an upstream resource to a downstream resource within the segment, depending on whether the upstream resource is stored within the segment or an other segment, determination of whether to propagate including:

if the upstream resource is stored within the segment, propagating the change in the classification level to the upstream resource if a changed classification level complies with the set of constraints; and if the upstream resource is stored in an other segment, propagating the change in the classification level to the upstream resource if the changed classification level complies with the set of constraints and is compatible with a classification level of the downstream resource.

10. The computing system of claim 1, wherein the implementing of the set of constraints within the segment further comprises controlling an ingestion of the second external resource into the segment based on the set of constraints, wherein the controlling the ingestion of the second external resource comprises:

determining that, upon merging or joining of the second external resource and the first external resource, that a resulting merged or joined resource would have a different classification level compared to a classification level of either the first external resource or the second external resource, and that the different classification level fails to satisfy the set of constraints, wherein the different classification level is more restrictive compared to the classification level of the first external resource or the second external resource to prevent the divulging of additional associations inferred as a result of the first external resource and the second external resource being merged or joined; and prohibiting the ingestion of the second external resource into the segment.

11. A computer-implemented method of a computing system that implements security controls within a data platform, comprising:

partitioning, within the data platform, segments, each segment having a different set of constraints, wherein the constraints comprise a maximum classification or one or more permitted classifications, wherein the maximum classification is selected from discrete hierarchical classification levels corresponding to different categories, the maximum classification defining a highest acceptable level corresponding to each of the categories in order for an external resource to conform with or satisfy the constraints, and the permitted classifications comprising non-hierarchical classifications;

implementing a set of constraints within a segment while insulating resources within the segment from inheriting the constraints; and controlling, via a wired or wireless communication network, an ingestion of a first external resource into the segment based on the set of constraints, wherein the controlling the ingestion of the first external resource comprises:

determining, for each of the categories in the segment, whether a corresponding classification level of the first external resource, as indicated by one or more markings of the first external resource, satisfies the set of constraints for each of the categories; and in response to the determining that the corresponding classification level of the first external resource fails to satisfy the set of constraints for one of the categories, selectively permitting, via the wired or wireless communication network, the ingestion of the first external resource into the segment while issuing a flag indicating a category of which the corresponding classification level of the first external resource failed to satisfy the set of constraints;

generating an issue or log associated with the first external resource;

ingesting, via the wired or wireless communication network, the issue or log into the segment; and propagating the set of constraints in the segment associated with the first external resource to the issue or the log;

in response to determining that the first external resource or that a second external resource has a classification level that fails to satisfy the set of constraints, determining or predicting whether the first external resource or the second external resource will have a future classification level that satisfies the set of constraints;

in response to the determining or predicting that the first external resource or the second external resource will have a future classification level that satisfies the set of constraints, ingesting the second external resource into the segment and at least temporarily restricting access to the first external resource or the second external resource.

12. The computer-implemented method of claim 11, wherein the maximum classification indicates that, if the corresponding level of the first external resource exceeds the maximum classification, then the first external resource fails to satisfy the set of constraints.

13. The computer-implemented method of claim 12, wherein implementation of the set of constraints includes:

defining a mirrored user constraint based on the maximum classification, the mirrored user constraint requiring a user attempting to access the segment to have at least a clearance level corresponding to the maximum classification.

14. The computer-implemented method of claim 13, wherein, even if first external resource or a different resource within the segment has a classification level at or below a corresponding clearance level of the user, the mirrored user constraint prohibits the user from accessing the first external resource or the different resource.

15. The computer-implemented method of claim 11, wherein the set of constraints comprise the maximum classification that includes the categories.

16. The computer-implemented method of claim 15, wherein the categories include a general classification level, a dissemination control, and a release control, and the controlling an ingestion of the first external resource into the segment includes:

determining whether a corresponding general classification level of the first external resource satisfies the general classification level indicated by the set of constraints;

determining whether a corresponding dissemination control of the first external resource satisfies the dissemination control indicated by the set of constraints;

determining whether a corresponding release control of the first external resource satisfies the release control indicated by the set of constraints; and in response to the determining that the corresponding general classification level, the corresponding dissemination control, and the corresponding release control of the first external resource satisfies the general classification level, the dissemination control, and the release control indicated by the set of constraints, permitting the ingestion of the first external resource into the segment.

17. The computer-implemented method of claim 11, wherein the set of constraints include a conjunctive classification rule and a disjunctive classification rule; and the implementation of the set of constraints comprises:

expanding the conjunctive classification rule to include implied hierarchical relationships among different levels associated with the conjunctive classification rule; and enforcing the disjunctive classification rule conjunctively such that, a particular resource that includes only some but not all disjunctive features indicated in the disjunctive classification rule is deemed to fail to satisfy the set of constraints.

18. The computer-implemented method of claim 11, wherein the implementation of the set of constraints within the segment includes determining whether to propagate a change in a classification level of an upstream resource to the downstream resource within the segment, depending on whether the upstream resource is stored within the segment or an other segment, the determination of whether to propagate including:

if the upstream resource is stored within the segment, propagating the change in the classification level to the upstream resource if a changed classification level complies with the set of constraints; and if the upstream resource is stored in an other segment, propagating the change in the classification level to the upstream resource if the changed classification level complies with the set of constraints and is compatible with a classification level of the downstream resource.

* * * * *